US010248860B2

(12) United States Patent
Mai et al.

(10) Patent No.: US 10,248,860 B2
(45) Date of Patent: Apr. 2, 2019

(54) SYSTEM AND METHOD FOR OBJECT RE-IDENTIFICATION

(71) Applicant: CANON KABUSHIKI KAISHA, Tokyo (JP)

(72) Inventors: Fei Mai, Marsfield (AU); Geoffrey Richard Taylor, Carlingford (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/814,282

(22) Filed: Nov. 15, 2017

(65) Prior Publication Data
US 2018/0075300 A1    Mar. 15, 2018

Related U.S. Application Data

(63) Continuation of application No. 14/869,791, filed on Sep. 29, 2015, now Pat. No. 9,852,340.

(30) Foreign Application Priority Data

Sep. 30, 2014 (AU) .................... 2014240213

(51) Int. Cl.
G06K 9/00 (2006.01)
G06K 9/32 (2006.01)
(Continued)

(52) U.S. Cl.
CPC ..... G06K 9/00624 (2013.01); G06K 9/00362 (2013.01); G06K 9/00771 (2013.01);
(Continued)

(58) Field of Classification Search
CPC ........... G06K 9/00624; G06K 9/00362; G06K 9/00771; G06K 9/32; G06K 9/4604; G06K 9/66; G06K 9/6228
See application file for complete search history.

(56) References Cited

U.S. PATENT DOCUMENTS 7,956,890 B2    6/2011   Cheng
2013/0343642 A1* 12/2013 Kuo ............... G06K 9/6256
                                                        382/159
2014/0098221 A1*  4/2014  Brown .......... G06K 9/00771
                                                        348/135

FOREIGN PATENT DOCUMENTS

CN   1254904 A    5/2000
CN   103617413 A  3/2014

OTHER PUBLICATIONS

Salvganini, Pietro, Bazzan, Loris, Cristani, Marco, Murino, Vittorio. "Person Re-Identification with a PTZ Camera: An introductory study". IEEE 2013.*

(Continued)

Primary Examiner — Kim Y Vu
Assistant Examiner — Molly Delaney
(74) Attorney, Agent, or Firm — Canon U.S.A., Inc. IP Division

(57) ABSTRACT

A method of identifying, with a camera, an object in an image of a scene, by determining the distinctiveness of each of a number of attributes of an object of interest, independent of the camera viewpoint, determining the detectability of each of the attributes based on the relative orientation of a candidate object in the image of the scene, determining a camera setting for viewing the candidate object based on the distinctiveness of an attribute, so as to increase the detectability of the attribute, and capturing an image of the candidate object with the camera setting to determine the confidence that the candidate object is the object of interest.

12 Claims, 13 Drawing Sheets

(51) Int. Cl.
*G06K 9/46* (2006.01)
*G06K 9/62* (2006.01)
*G06K 9/66* (2006.01)

(52) U.S. Cl.
CPC ............ *G06K 9/32* (2013.01); *G06K 9/4604* (2013.01); *G06K 9/66* (2013.01); *G06K 9/6228* (2013.01)

(56) References Cited

OTHER PUBLICATIONS

Denzler ("Information theoretic sensor data selection for active object recognition and state estimation") IEEE Transaction on Pattern Analysis and Machine Intelligence 2002.*

Shaogang Gong; Marco Cristani; Shuicheng Yan; Chen Change Loy "Person Re-Identification" Advances in Computer Vision and Pattern Recognition, pp. 357-358, Jan. 31, 2014.

Joachim Denzler; Christopher M. Brown "Information Theoretic Sensor Data Selection for Active Object Recognition and State Estimation" IEEE Transactions on Pattern Analysis and Machine Intelligence, vol. 24, No. 2, pp. 145-157, Feb. 2002.

Pietro Salvagnini; Loris Bazzani; Marco Cristani; Vittorio Murino, "Person Re-Identification With a PTZ Camera: An Introductory Study" IEEE International Conference on Image Processing, pp. 3552-3556, 2013.

\* cited by examiner

SYSTEM AND METHOD FOR OBJECT RE-IDENTIFICATION

REFERENCE TO RELATED PATENT APPLICATION(S)

The present application is a continuation of U.S. patent application Ser. No. 14/869,791, filed on Sep. 29, 2015, which claims priority from Australian Patent Application No. 2014240213 filed Sep. 30, 2014, which is hereby incorporated by reference herein in its entirety.

TECHNICAL FIELD

The present description relates generally to image processing and, in particular, to a method, system and apparatus for planning a sequence of camera settings, such as pan, tilt and zoom values, to be used to determine whether a candidate object is an object of interest. In one example, the terms "candidate object" and "object of interest" respectively refer to (i) a person in a crowded airport, the person being merely one of the crowd, and (ii) a person in that crowd that has been identified as being of particular interest. The present description also relates to a computer program product including a computer readable medium having recorded thereon a computer program for planning a sequence of camera settings to be used to determine whether a candidate object is the object of interest.

BACKGROUND

Public venues such as shopping centres, parking lots and train stations are increasingly subject to surveillance using large-scale networks of video cameras. Application domains of large-scale video surveillance include security, safety, traffic management and business analytics. A key task in many such applications is rapid and robust object re-identification, which is the problem of finding a specific object of interest across multiple cameras in the network. In one example application from the security domain, a security officer may want to view any video feed containing a particular suspicious target in order to identify undesirable activities. In another example from the business analytics domain, a shopping centre may wish to track a specific customer across multiple cameras in order to build a profile of shopping habits for that customer. In the following discussion, the term "object re-identification" will be understood to include the terms "object identification" and "object recognition".

Robust object re-identification is a challenging problem for several reasons. Firstly, the viewpoint (i.e. the relative orientation of the camera with respect to an object in the camera's field of view) and lighting may vary significantly between cameras in the network. For example, a single network may contain both outdoor cameras viewing targets at large distances in bright daylight, and indoor cameras viewing targets at close range under artificial lighting. Furthermore, many targets may have similar appearance and may vary only in minor details. For example, many commuters on public transport wear similar business attire but their appearance varies in regard to details such as neckwear and hair length. Also, public venues are often characterized by crowds of uncooperative targets moving in uncontrolled environments with varying and unpredictable distance, speed and orientation relative to the camera. The term "uncooperative target" refers to a target that is neither consciously nor unconsciously maintaining a particular relationship to a camera. Finally, cameras in the network may have non-overlapping fields of view, so that a given object cannot be continuously tracked from one camera to the next.

Common approaches for object re-identification include (i) appearance-based or attribute-based methods, and (ii) methods that apply to static cameras or active cameras. One known method for appearance-based object re-identification using static cameras models the appearance of an object by extracting a vector of low-level features based on colour, texture and shape from an exemplary image of the object. The features are extracted in a region of interest defined by a vertical stripe around the head of the target. Re-identification is based in part on computing an appearance dissimilarity score based on the Bhattacharyya distance between feature vectors extracted from images of a candidate target and the target of interest.

Another known method for attribute-based re-identification in static cameras uses a bank of support vector machine (SVM) classifiers to determine the presence or absence of 15 binary attributes (such as sunglasses, backpacks and skirts) from an image of a pedestrian. The SVM classifiers are trained on 2784-dimensional low-level colour and texture feature vectors from a training set of pedestrians with known attributes. To overcome the problem that different attributes are detected with varying reliability, an attribute distance metric (Mahalanobis distance) is learned based on a dataset of matching pairs of images of pedestrians. Re-identification is based in part on computing the learned attribute distance metric between the 15 attributes extracted from images of a candidate target and the target of interest.

The performance of the above re-identification methods based on static cameras suffers when objects are viewed across a large distance, which is common in large-scale video surveillance systems. Re-identification methods based on pan-tilt-zoom (PTZ) cameras can overcome this limitation by controlling the camera to capture high-resolution imagery of candidate objects at large distances. This approach will be referred to as one form of "active re-identification". One known method for active re-identification uses face detection to identify objects of interest. A static master camera is used to detect targets and estimate their gaze direction, and an active slave camera is used to obtain high-resolution face imagery of selected candidate targets. Candidate target selection is based on the expected information gain with respect to target identity from observing the target. The "expected information gain", also known as "mutual information", is the expected reduction in uncertainty about the identity of the target that results from making the observation. This method tends to select candidates that are both facing the slave camera and have uncertain identity. The drawback of this method is that it relies on a highly discriminative feature (i.e. face) captured in a specific viewpoint (i.e. frontal).

Another known method for active re-identification based on information theoretic concepts dynamically plans a sequence of PTZ settings to capture zoomed-in views of different regions on a candidate object to maximize the expected information gain with respect to the class of the candidate object. The term "class" refers to a semantic object category, such as "book" or "mug". The information gain is computed in part from the learned distribution of low-level image features of the object of interest under different PTZ settings. This method assumes that multiple images of each class of object under all available PTZ settings can be obtained offline in order to learn the feature distributions.

In another known related approach, a camera setting is controlled to maximize mutual information in a stochastic automaton such as an object detector. The stochastic automaton takes quantized image features (also known as "code words") at different scales as input. Code words are initially detected in a first captured image, and the camera setting is iteratively updated to observe individual code words at higher resolution. The camera setting is selected by maximizing the mutual information with respect to the state of cells in the stochastic automaton after observing code words that are taken as input to the cells Similar to the previous method, this method requires training data of the object of interest to train the stochastic automaton.

Yet another known method actively re-identifies pedestrians from a gallery of known people based on a sequence of zoomed-in observations of different body regions. The method first captures a whole-body image of the candidate and extracts a feature vector based on colour and texture. The feature vector is used to rank the gallery based on a Bhattachryya distance between the candidate and each gallery image. Each successive observation is then selected as the zoomed-in region giving the greatest feature variance across the gallery based on the current ranking. This method assumes that whole-body and zoomed-in views of all body regions are available for every object of interest in the gallery.

SUMMARY

It is an object of the present invention to substantially overcome, or at least ameliorate, one or more disadvantages of existing arrangements.

Disclosed are arrangements, referred to as Viewpoint Independent Distinctiveness Determination (VIDD) arrangements, which seek to address the above problems by determining distinctness of attributes of an object of interest independently of the relative orientation between the camera and the object of interest. This enables an object of interest to be re-identified in viewpoints under which it was not previously seen, unlike existing methods that require the object of interest to have been previously viewed under specific viewpoints. Furthermore, the disclosed VIDD arrangement includes enabling an object of interest to be re-identified without any previous images of the object, when based on a semantic description of the object.

According to a first aspect of the present invention, there is provided a method of identifying, with a camera, an object in an image of a scene, the method comprising the steps of:
  determining a distinctiveness of each of a plurality of attributes of an object of interest, independent of a camera viewpoint;
  determining a detectability of each of the plurality of attributes of a candidate object in the image of the scene based on a relative orientation of the candidate object;
  determining a camera setting for viewing the candidate object based on the determined distinctiveness of at least one attribute, so as to increase the detectability of the at least one attribute; and
  capturing an image of the candidate object with the determined camera setting to determine a confidence that the candidate object is the object of interest.

According to another aspect of the present invention, there is provided an apparatus comprising:
  a camera for capturing an image of an object of interest and an image of a candidate object in a scene;
  a processor; and
  a memory storing a computer executable software program for directing the processor to perform a method for identifying, with the camera, an object in the image of the scene, the method comprising the steps of:
  determining a distinctiveness of each of a plurality of attributes of the object of interest, independent of a camera viewpoint;
  determining a detectability of each of the plurality of attributes of a candidate object in the image of the scene based on a relative orientation of the candidate object;
  determining a camera setting for viewing the candidate object based on the determined distinctiveness of at least one attribute, so as to increase the detectability of the at least one attribute; and
  capturing an image of the candidate object with the determined camera setting to determine a confidence that the candidate object is the object of interest.

According to another aspect of the present invention, there is provided an apparatus for identifying, with a camera, an object in an image of a scene the apparatus comprising:
  a distinctiveness determination module for determining a distinctiveness of each of a plurality of attributes of the object of interest, independent of a camera viewpoint;
  a detectability determination module for determining a detectability of each of the plurality of attributes of a candidate object in the image of the scene based on a relative orientation of the candidate object;
  a camera setting determination module for determining a camera setting for viewing the candidate object based on the determined distinctiveness of at least one attribute, so as to increase the detectability of the at least one attribute; and
  a capturing module for capturing an image of the candidate object with the determined camera setting to determine a confidence that the candidate object is the object of interest.

According to another aspect of the present invention, there is provided a computer readable non-transitory memory storing a computer executable software program for directing processor to perform a method for identifying, with a camera, an object in an image of a scene, the method comprising the steps of:
  determining a distinctiveness of each of a plurality of attributes of the object of interest, independent of a camera viewpoint;
  determining a detectability of each of the plurality of attributes of a candidate object in the image of the scene based on a relative orientation of the candidate object;
  determining a camera setting for viewing the candidate object based on the determined distinctiveness of at least one attribute, so as to increase the detectability of the at least one attribute; and
  capturing an image of the candidate object with the determined camera setting to determine a confidence that the candidate object is the object of interest.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Context

Figure 1A:
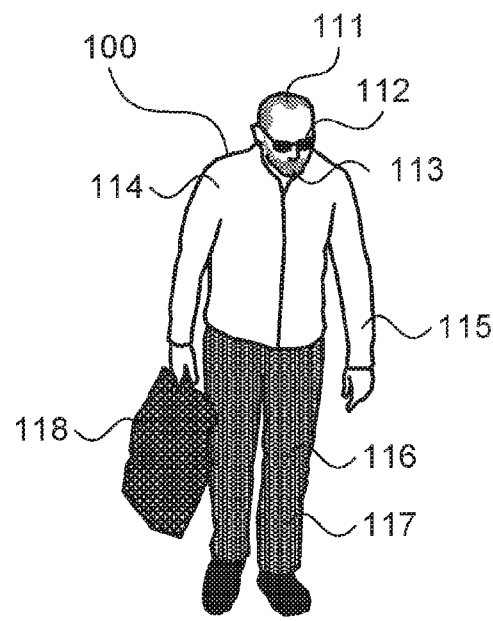
FIG. 1A is a simplified diagram illustrating attributes that are used to describe an exemplary object of interest according to one VIDD arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

The prior art active re-identification methods referred to in the BACKGROUND section require images of the candidate object or object of interest to be captured under specific camera settings or viewing conditions (including all possible viewing conditions). In the present description, the "viewing conditions" refer to the conditions under which the image of an object was captured, such as the distance between the camera and the object, the focal length and resolution of the camera, and the orientation of the object relative to the camera (i.e. the viewpoint). Large-scale surveillance scenarios are characterized by uncooperative targets moving in uncontrolled environments. Practical applications thus present unfavourable conditions for known active re-identification methods.

The present description provides a method and system for identifying an object of interest in a scene using a camera, based on attributes of the object, by planning a sequence of camera settings to be used in order to improve the detectability of the most distinctive attributes. In the present description, an "attribute" is a categorical characteristic of an object that can be observed in an image, such as "hair length". The terms "class" and "class label" and "attribute label" interchangeably refer to a particular manifestation of an attribute, such as the class label "long hair" for the attribute "hair length". The "detectability" of an attribute in a particular image refers to the certainty with which the attribute can be determined from the image.

Figure 1B:
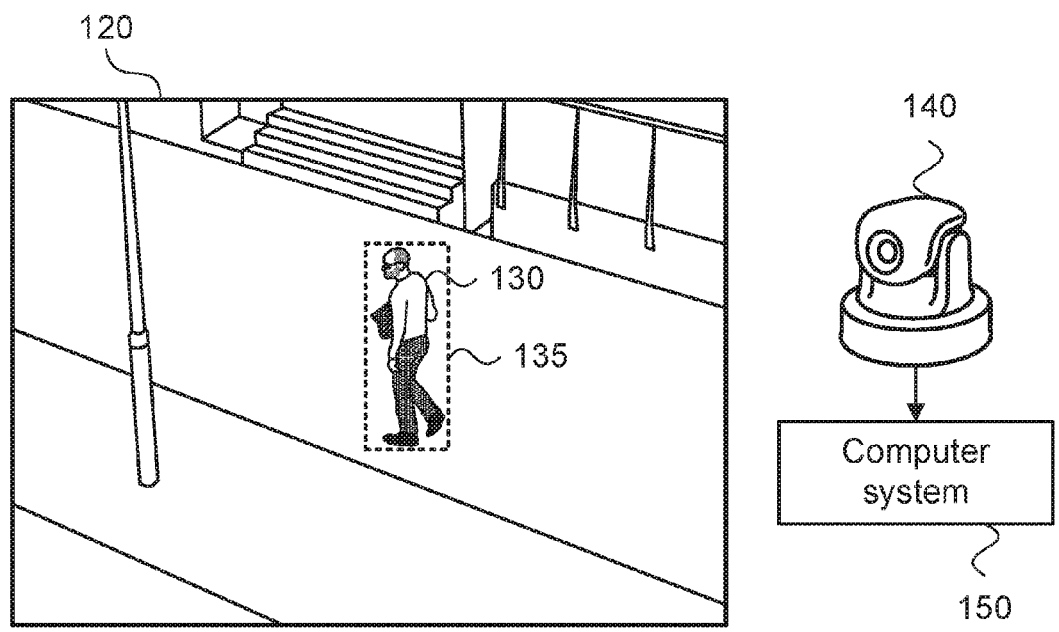
FIG. 1B is a simplified diagram illustrating an image of an exemplary candidate object captured by a PTZ camera, to which VIDD arrangements may be applied.

FIGS. 1A and 1B illustrate an exemplary use case to which VIDD arrangements may be applied. In this example, the goal is to determine when a person of interest 100 (which is the object of interest in this example) is present in an image 120 of a scene under the surveillance of a PTZ camera 140. In the following discussion, a "candidate object" refers to any observed object that is potentially the object of interest, but which currently has an unknown identity. For example, a pedestrian 130 in the image 120 of the scene observed by the camera 140 is a candidate object for the object of interest 100.

FIG. 1B shows the image 120 of the scene captured by the digital camera 140.

Figure 11:
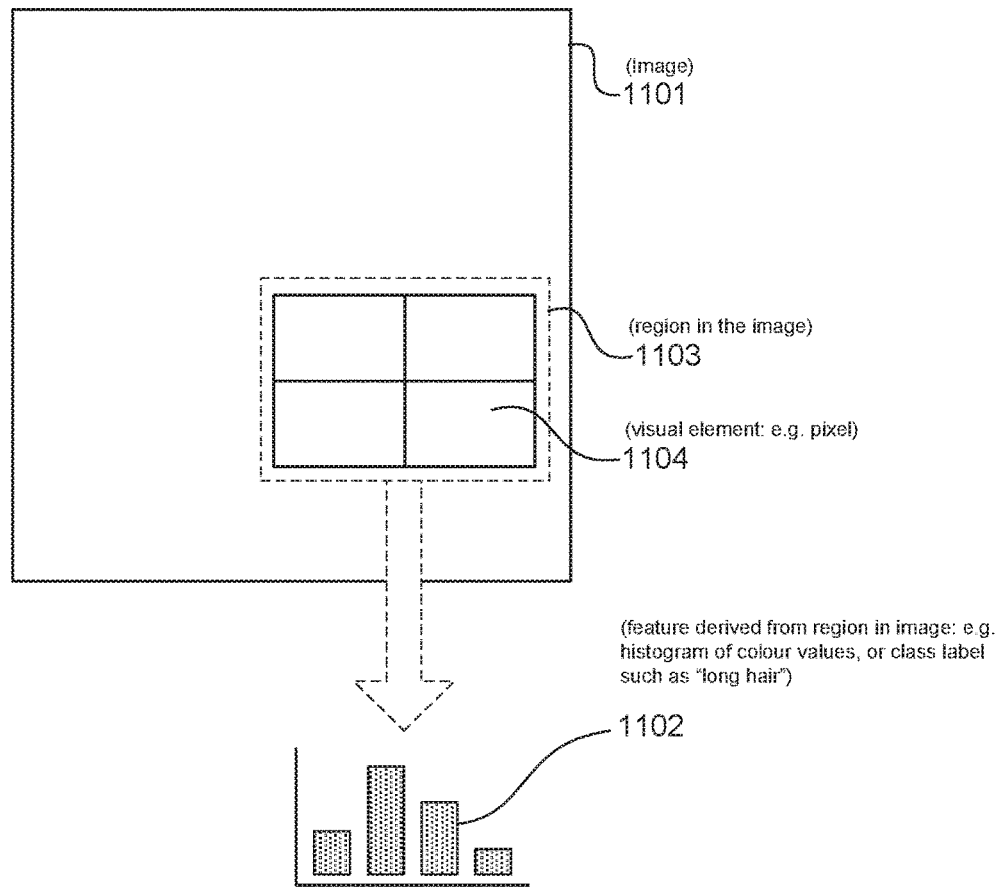
FIG. 11 depicts relationships between terms used in this description.

FIG. 11 depicts some of the terms used in this description. An image 1101 is made up of visual elements such as 1104. The terms "pixel", "pixel location" and "image location" are used interchangeably throughout this description to refer to one of the visual elements in the captured image. Each pixel is described by one or more values characterising a property of the captured scene. In one example, a single intensity value characterises the brightness of the scene at the pixel location. In another example, a triplet of values characterise the colour of the scene at the pixel location. A "region" 1103 in the image 1101 refers to a collection of one or more spatially adjacent visual elements such as 1104. A "feature" 1102 represents a derived value or set of derived values determined from the pixel values in the image region 1103. In one example, a feature is a histogram of colour values in the image region 1103. In another example, a feature is an "edge" value determined by estimating an intensity gradient in the region 1103. In yet another example, a feature is a class label describing an attribute in the image region 1103, such as the label "hat" in a region containing a head. The class label is determined by applying a Support Vector Machine (SVM) or other classification method to features extracted from the image region 1103.

The person of interest 100 is described in terms of a fixed set of attributes such as "hair length", wherein each attribute is assigned a discrete class label (e.g. "long hair"). In one VIDD arrangement, the attributes are soft biometrics describing a person of interest. Soft biometrics encode categorical semantic information representing features favoured by human observers for describing other people. In one example, a person is described using the soft biometric (attribute) "hair length" which takes on one of the class labels "long hair" or "short hair". In the present discussion, the terms "class label" and "class" are used interchangeably, and the terms "attribute" and "soft biometric" are used interchangeably. For the exemplary person 100 in FIG. 1A, a soft biometric description may comprise the class label "short hair" assigned to attribute "hair length" 111, class label "wearing sunglasses" assigned to attribute "eyewear type" 112, class label "wearing beard" assigned to attribute "facial hair style" 113, class label "light shade top" assigned to attribute "shade of top" 114, class label "long sleeves" assigned to attribute "sleeve length" 115, class label "dark shade pants" assigned to attribute "shade of pants" 116, class label "long pants" assigned to attribute "pants length" 117 and class label "shoulder bag" assigned to attribute "luggage type" 118. Soft biometrics can be detected across different viewpoints, can be easily adapted to appearance changes (such as removing sunglasses), are more compact than appearance-based models, and can be constructed from a textual or verbal description (for example, a written statement from a witness of a crime). Thus soft biometrics (and attributes in general) are suited to the task of re-identifying an object across different viewpoints in a camera network, based on a minimal description of the object.

While the examples in the following description mostly relate to identifying a person of interest, the VIDD arrangements described in the present description may equally be practised on other types of objects. In one example, the VIDD method is applied to identifying a vehicle of interest described by attributes such as "body colour", "headlight shape" and "presence of spoiler". In another example, the VIDD method is applied to identifying an animal of interest described by attributes such as "tail length", "fur colour" and "fur length". Attributes can be any categorical image feature, and need not be semantic In yet another example, the VIDD method is applied to identifying an object of interest using a learned set of visual words based on low-level image features extracted from interest points on the candidate objects in the scene. VIDD arrangements may be applied to different types of cameras. In one example, used in the following description, the VIDD arrangement is used to control the orientation and zoom of a PTZ camera. In another example, the VIDD arrangement is used to control other camera settings that affect the viewing conditions, such as focus and exposure value. In another example, the VIDD method is used to select a region of interest in a static high-resolution video stream for further processing.

In the following discussion, the "distinctiveness" of an attribute describes how unique the attribute class label is to the object of interest, compared to other candidate objects that may be observed by the camera. The other objects are collectively referred to as the "population" of candidate objects. In one example, the class label "wearing hat" has high distinctiveness if relatively few people in the population wear a hat. Conversely, "wearing hat" has low distinctiveness if most other people in the population wear a hat (for example, when the scene is outside on a sunny day). The "detectability" of an attribute describes the degree of certainty with which the attribute can be detected in an image of a candidate object. In general, the detectability varies with the viewing conditions, such as the distance between the camera and the object, the focal length and resolution of the camera, and the orientation of the object relative to the camera (i.e. the viewpoint). For example, the presence or absence of a beard may have high detectability in a zoomed-in frontal image of a face. Conversely, a beard may be difficult to detect when a person is facing away from a camera, or when the person is very far from the camera.

As illustrated in FIG. 1B, the digital camera 140 communicates with the computer system 150. This exemplary VIDD arrangement can be applied to a range of applications. In one example, the computer system 150 can allow a security guard to specify the attributes of a suspicious target through an interactive user interface, and returns images of one or more candidate targets determined to be the suspicious target. In another example, the computer can identify individual customers in different cameras observing a retail space such as a shopping centre, and automatically builds models of customer behaviour to be used for retail analytics. In yet another example, the computer system can identify the location of individual vehicles at different times across a traffic camera network, and uses this information to control traffic signals to improve traffic flow.

Overview of the Invention

As described above, the present description relates to methods for determining whether a candidate object observed by a camera is an object of interest. As noted earlier, known solutions to this problem require images of the candidate object or the object of interest to be captured under specific viewing conditions. For example, an existing method based on face recognition requires at least one frontal face image of both the candidate object and object of interest. Furthermore, an existing method based on low-level image features requires images of the candidate object under all practical viewing conditions. Consequently, existing methods may perform poorly when the viewing conditions cannot be constrained as described. An example of this limitation is the task of identifying a shoplifter based on a witness description (i.e. no image of the shoplifter is available), in a shopping centre where candidate targets are free to move in large open spaces.

The VIDD method described in the present description overcomes the above limitation by describing objects using a plurality of attributes detectable over a range of viewing conditions. This allows the object of interest to be identified under viewing conditions in which it has not been previously observed. Furthermore, the method obtains a sequence of observations that maximize the reduction in uncertainty about the identity of a candidate object. This is achieved by actively controlling the camera settings to improve the detectability of the most distinctive attributes given the current viewpoint (i.e. the relative orientation of a candidate object with respect to the camera). This control process is referred to as "PTZ interrogation". Since candidate objects may appear only temporarily within view of the camera, the goal of PTZ interrogation is to maximize the information gained about the identity of each candidate object with the minimal number of captured images.

Figure 10A:
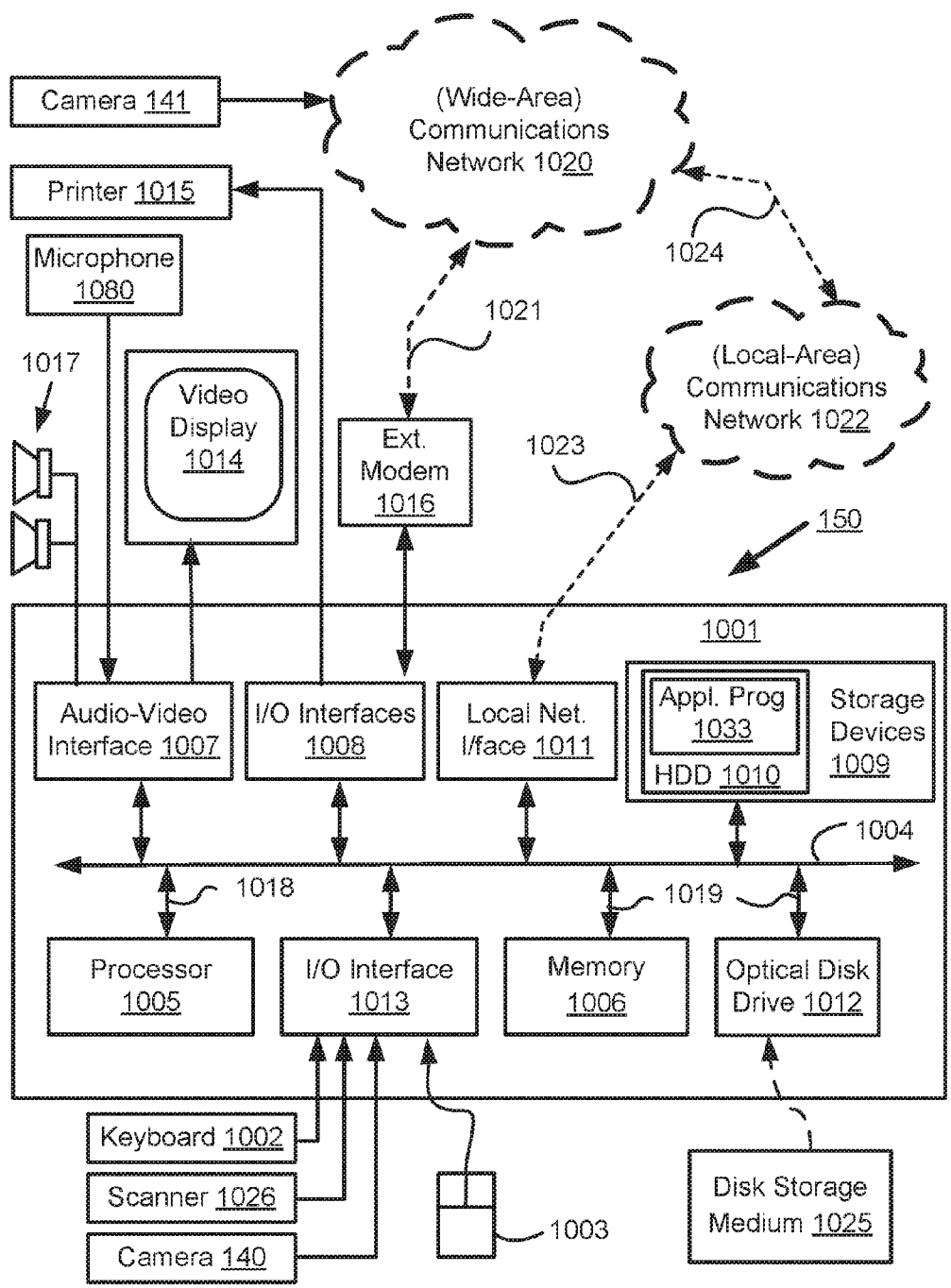
FIGS. 10A and 10B form a schematic block diagram of a general purpose computer system upon which VIDD arrangements described can be practiced.
Figure 10B:
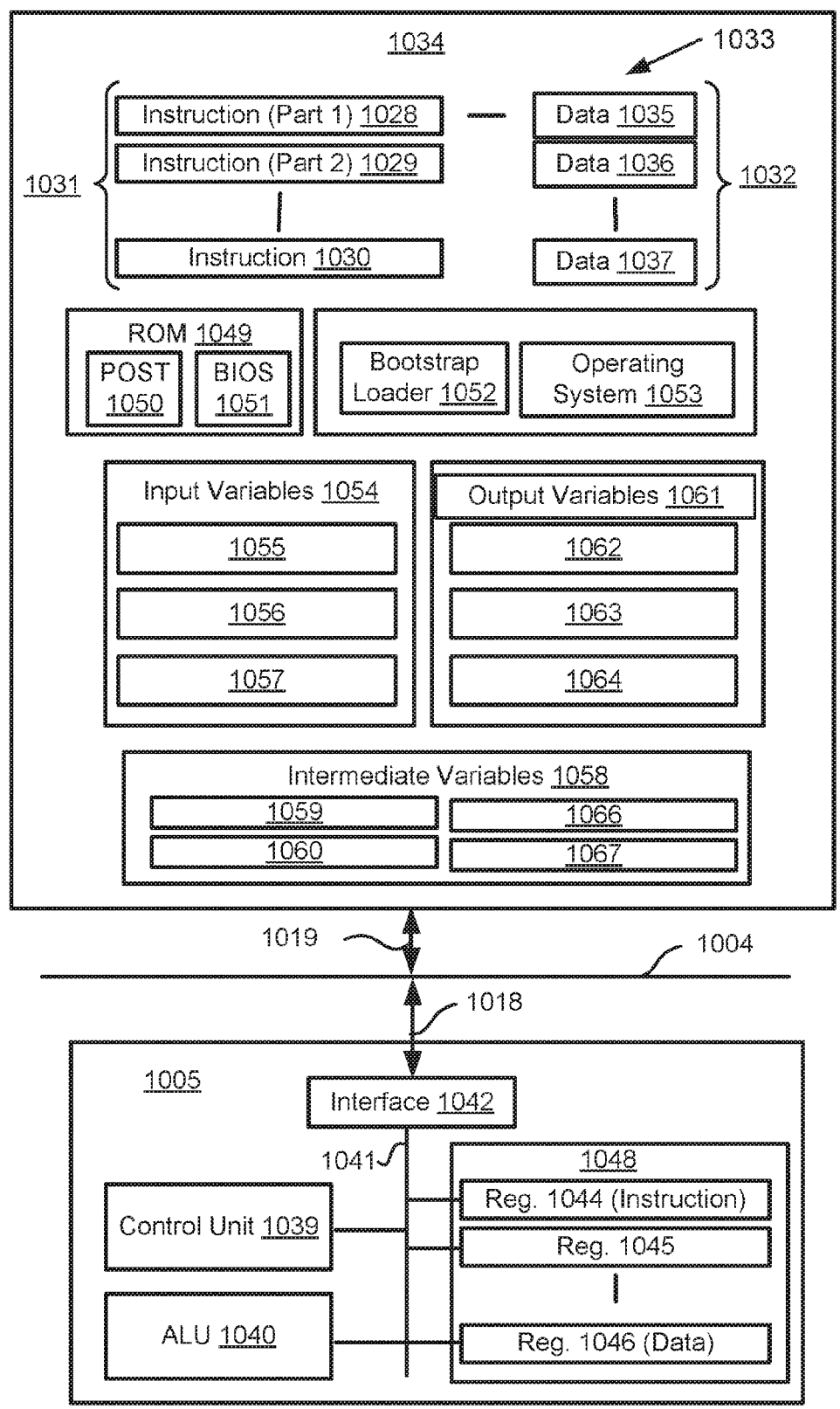

FIGS. 10A and 10B depict a general-purpose computer system 150, upon which the various VIDD arrangements described can be practiced.

As seen in FIG. 10A, the computer system 150 includes: a computer module 1001; input devices such as a keyboard 1002, a mouse pointer device 1003, a scanner 1026, one or more cameras such as the camera 140, and a microphone 1080; and output devices including a printer 1015, a display device 1014 and loudspeakers 1017. An external Modulator-Demodulator (Modem) transceiver device 1016 may be used by the computer module 1001 for communicating to and from remote cameras such as 141 over a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 140 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 150 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth® wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 150.

The components 1005 to 1013 of the computer module 1001 typically communicate via an interconnected bus 1004 and in a manner that results in a conventional mode of operation of the computer system 150 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or a like computer systems.

The VIDD method may be implemented using the computer system 150 wherein the processes of FIGS. 4, 5, 7A, 8 and 9, to be described, may be implemented as one or more VIDD software application programs 1033 executable within the computer system 150. In particular, the steps of the VIDD method are effected by instructions 1031 (see FIG. 10B) in the software 1033 that are carried out within the computer system 150. The software instructions 1031 may be formed as one or more code modules, each for performing one or more particular tasks. The software may also be divided into two separate parts, in which a first part and the corresponding code modules performs the VIDD methods and a second part and the corresponding code modules manage a user interface between the first part and the user.

The VIDD software may be stored in a computer readable medium, including the storage devices described below, for example. The software is loaded into the computer system 150 from the computer readable medium, and then executed by the computer system 150. A computer readable medium having such software or computer program recorded on the computer readable medium is a computer program product. The use of the computer program product in the computer system 150 preferably effects an advantageous apparatus for implementing the VIDD method.

The software 1033 is typically stored in the HDD 1010 or the memory 1006. The software is loaded into the computer system 150 from a computer readable medium, and executed by the computer system 150. Thus, for example, the software 1033 may be stored on an optically readable disk storage medium (e.g., CD-ROM) 1025 that is read by the optical disk drive 1012.

A computer readable medium having such software or computer program recorded on it is a computer program product. The use of the computer program product in the computer system 150 preferably effects an apparatus for practicing the VIDD arrangements.

In some instances, the VIDD application programs 1033 may be supplied to the user encoded on one or more CD-ROMs 1025 and read via the corresponding drive 1012, or alternatively may be read by the user from the networks 1020 or 1022. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 150 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 150 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 150 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The VIDD application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1105 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed VIDD arrangements use input variables 1054, which are stored in the memory 1034 in corresponding memory locations 1055, 1056, 1057. The VIDD arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:
  a fetch operation, which fetches or reads an instruction 1031 from a memory location 1028, 1029, 1030;
  a decode operation in which the control unit 1039 determines which instruction has been fetched; and
  an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 4, 5, 7A, 8 and 9 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The VIDD method may alternatively be implemented in dedicated hardware such as one or more integrated circuits performing the VIDD functions or sub functions. Such dedicated hardware may include graphic processors, digital signal processors, or one or more microprocessors and associated memories, and may reside on platforms such as video cameras.

Figure 2:
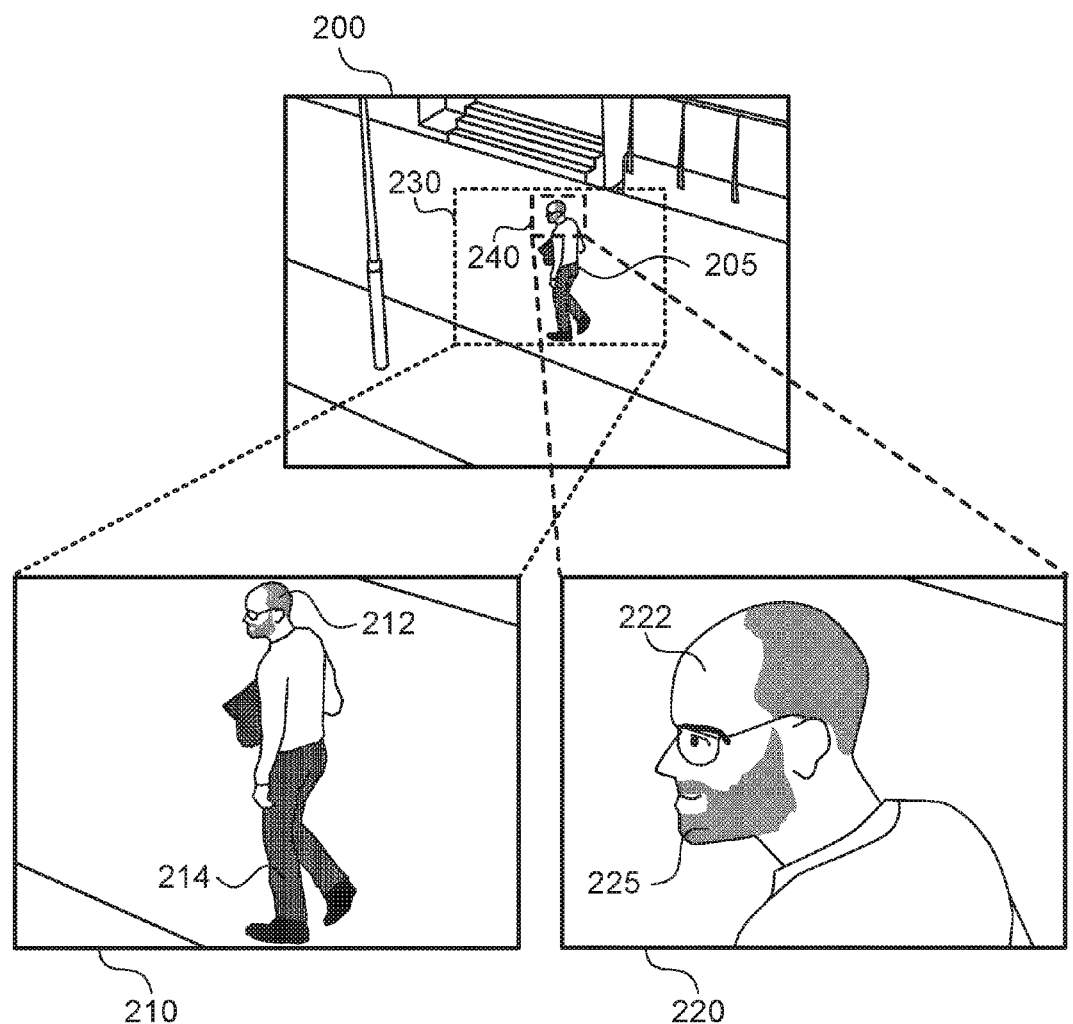
FIG. 2 is a simplified diagram illustrating an image of an exemplary candidate object captured under different camera settings, to which VIDD arrangements may be applied.

FIG. 2 illustrates a planning process for use in PTZ interrogation, according to one VIDD arrangement. A first image 200 of a scene containing a candidate object 205 is captured (by the camera 140 or another camera 141 as controlled by the processor 1005 as directed by the VIDD arrangement software 1033 in a step 420 in FIG. 4) with low zoom. Based on the first image 200, a second image (210 or 220) is captured (by the camera 140 or the other camera 141 as controlled by the processor 1005 as directed by the VIDD arrangement software 1033 in the step 420 in FIG. 4 after processing the first image 200 using steps 420, 425, 430, 440, 450 and 460 in FIG. 4 according to the VIDD arrangement) showing a region of the candidate object in high resolution to improve the detectability of distinctive attributes. A camera setting used for the second image (210 or 220) is selected from amongst a plurality of provisional camera settings. The "provisional camera settings", as determined using step 910 in FIG. 9, may be predetermined based on rules such as observing the "head", "torso" and "legs" of the target, or may include all possible PTZ settings of the camera for capturing the second image.

The one potential view 210, corresponding to a region 230 in the image 200 of the original scene, allows for the detection of attributes across the whole object 205 with medium detectability. The other potential view 220, corresponding to a region 240 in the image 200 of the original scene, allows for the detection of attributes of the 222 head with high detectability. The camera settings selected to capture the view 210 or the view 220 are selected based in part on the expected increase in detectability of distinctive attributes associated with the view 210 or the view 220 (as determined by the processor 1005 as directed by the VIDD arrangement software 1033 in a step 820 in FIG. 8). For example, if "wearing beard" is the single most distinctive attribute of the object of interest, the view 220 is selected in order to maximize the detectability of the beard 225. Alternatively, if "long pants" and "short hair" are both distinctive attributes, the view 210 may be selected to trade sub-optimal detectability for observing two distinctive attributes, namely both the hair 212 and pants 214.

Figure 3:
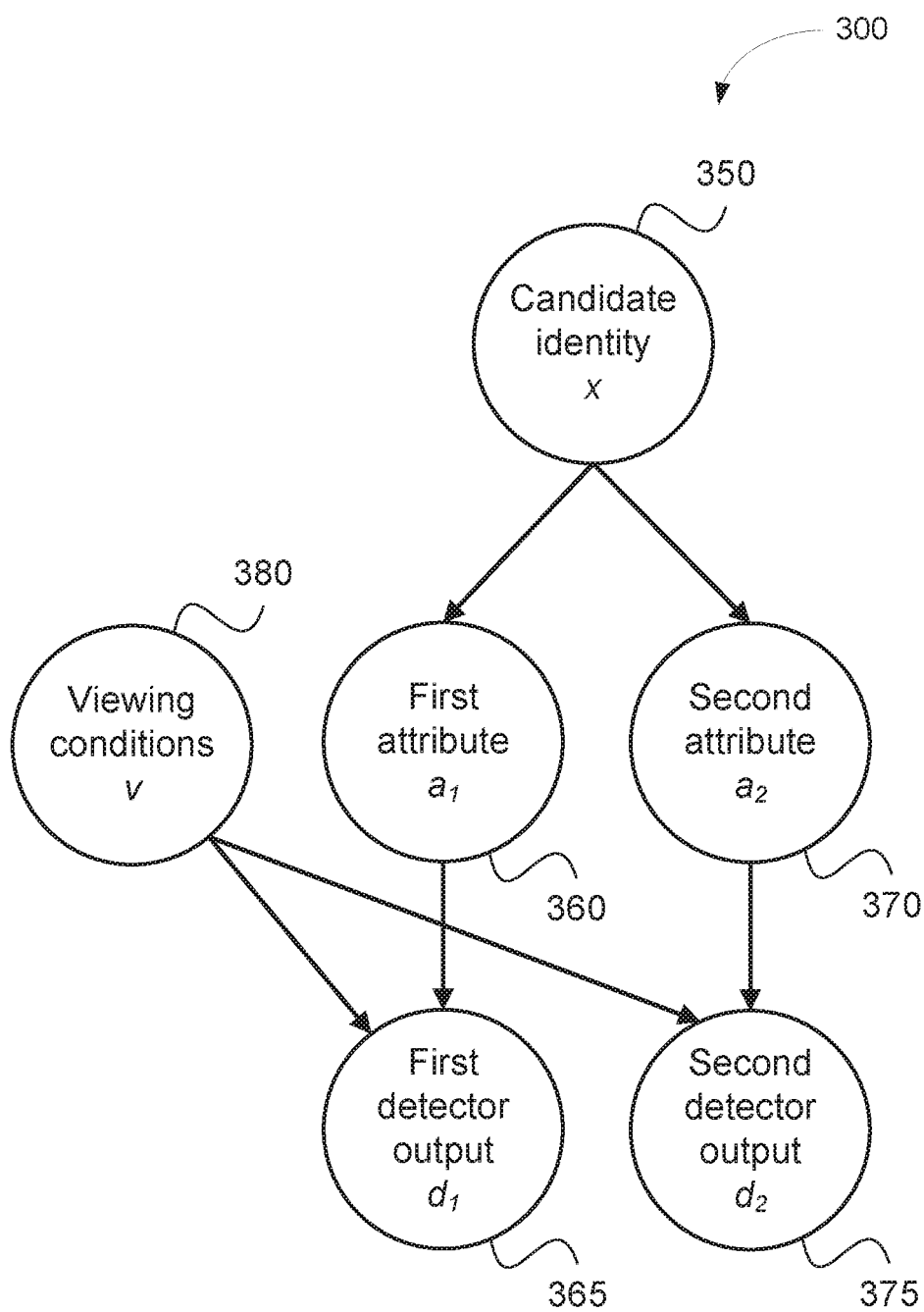
FIG. 3 is a simplified diagram of a belief network relating the identity of a candidate object to the detected attributes according to one VIDD arrangement.

FIG. 3 depicts a belief network 300 that is used in the present description for object identification using Bayesian inference. Let x represent the binary decision of whether the candidate object is the object of interest, represented by a node 350. In the following discussion, x=1 represents the decision that the candidate object is the object of interest, and x=0 represents the contrary. Let $a=\{a_i\}$, $i=1, \ldots, N$ represent a set of N attributes $a_i$ of the object of interest (where an attribute $a_i$ may for example be "hair length" or "facial hair style" and so on). The attribute $a_i$ takes on a class label $l_i \in \{1, \ldots, L_i\}$ from the $L_i$ possible class labels for attribute $a_i$ (where a class label $l_i$ may for example be "short" or "long" for the attribute "hair length", or "wearing beard" or "clean shaven" for the attribute "facial hair style" and so on). Let $d=\{d_i\}$, $i=1, \ldots, N$ represent the outputs of N attribute detectors $d_i$ applied to a captured image (where an attribute detector output $d_i$ may for example represent an observation of the attribute "hair length" or "wearing beard" for the candidate target). The detector output $d_i$ also takes on a class label $l_i \in \{1, \ldots, L_i\}$ from the $L_i$ possible class labels for attribute $a_i$ (where as above a class label $l_i$ may for example be "short" or "long" for the detector output for attribute "hair length", or "wearing beard" or "clean shaven" for the detector output for attribute "facial hair style", and so on). Finally, let v represent the viewing conditions represented by node 380 (where a viewing condition v may for example be the pan, tilt and zoom settings of the camera and the relative orientation of the target with respect to the camera).

The network 300 in FIG. 3 captures the notion that the attributes (e.g. "facial hair style", "pants length" and "hair length") of a candidate object depend upon the identity of the candidate object in question (i.e. whether the candidate object is the object of interest). The network 300 further captures the notion that the output of a noisy attribute detector depends on both the viewing conditions and the attributes of the object. FIG. 3 shows the belief network 300 for two attributes, $a_1$ represented by a node 360 and $a_2$ represented by a node 370, and the output of their corresponding attribute detectors, $d_1$ represented by a node 365 and $d_2$ represented by a node 375. The generalization of the graph structure from two to N attributes is straightforward for those in the relevant art.

In Bayesian statistics, the posterior probability of a random event or an uncertain proposition is the conditional probability that is assigned after the relevant evidence is taken into account. In contrast, in Bayesian statistical inference, a prior probability of an uncertain quantity expresses one's uncertainty before some evidence is taken into account. In the following discussion, the terms "probability", "likelihood", "confidence" and "uncertainty" are used interchangeably to describe the degree of belief in a proposition, unless otherwise indicated.

Based on FIG. 3, the posterior probability p(x|d,v) (i.e. confidence) that a candidate object is the object of interest given a set of attribute detections $d=\{d_i\}$ from an image of the candidate object the image having been captured with viewing conditions v is defined by a "Posterior Probability Equation" in accordance with Equation (1) as:

$$p(x|d,v) = \frac{p(x) \sum_{l_1,\ldots,l_N} \prod_i p(a_i=l_i|x) p(d_i|a_i=l_i,v)}{\sum_{j \in \{0,1\}} p(x=j) \sum_{l_1,\ldots,l_N} \prod_i p(a_i=l_i|x=j) p(d_i|a_i=l_i,v)} \quad (1)$$

Equation (1) combines a previous confidence about the identity of the target (i.e. the prior p(x)) with observations (i.e. detector outputs $d_i$) and knowledge about the reliability of those observations (i.e. the detectability of attributes $a_i$ under viewing conditions v) to compute a new confidence about the identity of the target (i.e. the posterior p(x|d,v)). In Equation (1) above, term p(x) represents the prior probability that the candidate object is the object of interest, corresponding to the output 811 of step 810 in FIG. 8. A term $p(a_i|x)$ represents the probability of the object having attribute $a_i$ given the identity x of the object. For example, $p(a_1|x=1)$ is the probability that the object of interest has attribute $a_1$, while $p(a_1|x=0)$ is the probability that a random object from the population has attribute $a_1$. The probabilities 1203, 1206 (see FIG. 12) correspond to the terms $p(a_i|x=1)$ and $p(a_i|x=0)$ in Equation (1) respectively, which are the output 411 of step 410 in FIG. 4. Term $p(d_i|a_i, v)$ is the probability of an observed attribute detector output $d_i$, given the attribute of the object $a_i$ and the viewing conditions v. This quantity represents the detectability of attribute $a_i$ when observed under viewing conditions v, corresponding to the output 821 of step 820 in FIG. 8. For example, if $a_1$ is a binary attribute class label, then $p(d_1=1|a_1=0, v)$ is the probability of incorrectly detecting attribute $a_1$ under viewing condition v (also known as a "false positive" detection), while $p(d_1=1|a_1=1, v)$ is the probability of correctly detecting attribute $a_1$ under viewing condition v (also known as a "true positive" detection).

In one arrangement, the conditional probability distributions $p(a_i|x=1)$ and $p(a_i|x=0)$ which represent respectively the probability that the object of interest or object from the population has attribute $a_i$ is be determined empirically from T training images, where $T \geq 1$. In the case of $p(a_i|x=1)$, the T training images are images of the object of interest. In the case of $p(a_i|x=0)$, the T training images are images of random objects from the population. First, each training image is processed with a detector for attribute $a_i$, which results in the set of outputs $d_i=\{d_i^t\}$, $t=1, \ldots, T$. Then, the marginal distribution $p(d_i|x=j)$ (where j=0 or 1) of detector outputs for objects in the training images can be approximated from the frequency of each class label $l_i$ in $d_i$. Finally, a constrained linear system is constructed as defined by the "Attribute Inference Constraints" in accordance with Equation (2) as:

$$p(d_i|x=j) = \sum_{v,l} p(d_i|a_i=l_i,v) p(a_i=l_i|x=j) p(v)$$

$$0 \leq p(a_i=l_i|x=j) \leq 1 \quad (2)$$

Equation (2) above relates the observed frequency of class labels among detector outputs for images of the object of interest or object from the population (i.e. the marginal distribution $p(d_i|x=j)$) to the likelihood that the object has a corresponding attribute (i.e. the unknown probabilities $p(a_i=l_i|x=j)$). In Equation (2), term $p(a_i=l_i|x=j)$ represents the likelihood that the object has class label $l_i$ for attribute $a_i$, which is represented for example by the probability 1203 for $p(a_i=l_i|x=1)$ or 1206 for $p(a_i=l_i|x=0)$ in FIG. 12 for $l_i$ corresponding to the class label "Glasses". These probabilities also correspond to the output 411 of step 410 in FIG. 4. Term $p(d_i|a_i=l_i,v)$ is the detectability of attribute $a_i$ under viewing condition v. In one arrangement, the detectability of an attribute is determined based on the performance of an attribute classifier for the attribute, on a test set captured under viewing condition v, as described in more detail hereinafter. Term p(v) is the prior probability of capturing an image under viewing condition v. In one example, p(v) is determined by assuming that images are captured under every possible viewing condition with uniform frequency. The inequality $0 \leq p(a_i=l_i|x=j) \leq 1$ in Equation (2) represents the constraint that probabilities are always expressed as quantities in the range zero to one inclusive.

Equation (2) provides $L_i$ constraints, one of which is replaced with the normalization constraint $\Sigma_{l_i} p(a_i=l_i|x=j)=1$. The above system can be solved for the $L_i$ unknown values of $p(a_i=l_i|x=j)$ (for j=0 or 1) using methods known in the art.

PTZ interrogation is formulated using information theoretic principles, based on the belief network show in FIG. 3. As stated earlier, the goal of PTZ interrogation is to select a camera setting that maximizes the reduction in uncertainty about the identity x of a candidate object. Let v* represent the optimal viewing condition corresponding to the selected camera setting. An information theoretic approach to reducing uncertainty is to select v* such that the mutual information I(x; d|v*) (i.e. expected information gain) about the object identity x after detecting attributes d under viewing condition v* is maximized. Based on FIG. 3, the mutual information I(x; d|v) is defined by the "Mutual Information Objective Function" in accordance with Equation (3) as follows:

$$I(x; d \mid v) = \sum_{d, j \in \{0,1\}} p(x=j)(d \mid x, v) \log \frac{p(d \mid x, v)}{p(d \mid v)} \tag{3}$$

Equation (3) represents the expected reduction in uncertainty about the identity x of the candidate object that results from observing attributes of the object d under a predicted viewing condition v. The predicted viewing condition v corresponds to output 916 of step 915 in FIG. 9. The mutual information I(x; d|v) computed using Equation (3) and the associated viewing condition v for a tuple $(v, I(x; d|v))_k$ that represents the output 931 of step 930 in FIG. 9, for the k-th predicted viewing condition. Term p(x=j) represents the prior probability of the identity of the candidate object, which is equal to the posterior probability p(x|d, v) 411 output at step 440 of FIG. 4. For the case x=1, term p(d|x, v) represents the probability of observing a particular set of attribute detections d for the object of interest under predicted viewing condition v, and for case x=0, term p(d|x, v) represents the probability of observing the same attribute detections d for an object in general population under viewing condition v. Term p(d|v) represents the probability of observing a particular set of attribute detections d under viewing condition v (i.e. regardless of the identity of the object). Terms p(d|x, v) and p(d|v) are defined in accordance with Equations (4) and (5) as:

$$p(d|x,v) = \Sigma_{l_1, \ldots, l_N} \Pi_i p(a_i=l_i|x) p(d_i|a_i=l_i, v) \tag{4}$$

$$p(d|v) = \Sigma_{j \in \{0,1\}} p(x=j) \Sigma_{l_1, \ldots, l_N} \Pi_i p(a_i=l_i|x=j) p(d_i|a_i=l_i, v) \tag{5}$$

Term $p(a_i=l_i|x)$ in Equation (4) and term $p(a_i=l_i|x=j)$ in Equation (5) represent the probability of the object having class label $l_i$ for attribute $a_i$ given the identity x of the object. These values correspond for example to the probabilities 1203, 1206 in FIG. 12, and are the output 411 of step 410 in FIG. 4. Term $p(d_i|a_i=l_i, v)$ in Equations (4) and (5) represents the detectability of attribute $a_i$ under viewing condition v, corresponding to the output 921 of step 920 in FIG. 9. Term p(x=j) represents the prior probability of the identity of the candidate object, which is equal to the posterior probability p(x|d, v) 411 output at step 440 of FIG. 4. The optimal viewing condition v* is obtained by maximizing the Mutual Information Objective Function in Equation (3) in accordance with Equation (6) as:

$$v^* = \operatorname*{argmax}_{v} I(x; d \mid v) \tag{6}$$

Equation (6) selects the viewing condition that provides the greatest reduction in uncertainty about the identity of the candidate object. The camera setting corresponding to the optimal viewing condition v* computed by Equation (6) corresponds to the new camera setting output 461 of step 460 in FIG. 4.

Embodiment (with Examples and Alternatives)

Figure 4:
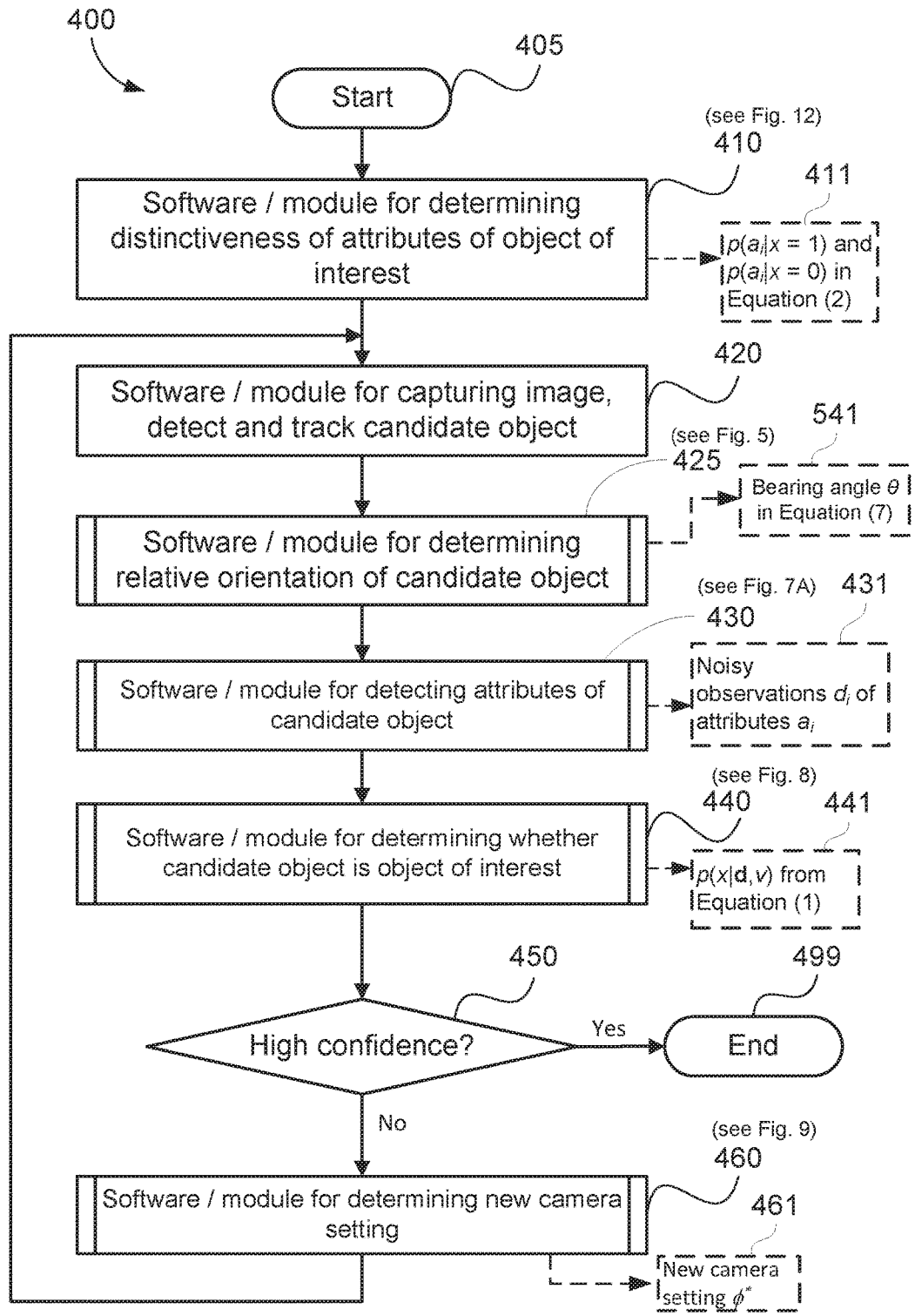
FIG. 4 is a schematic flow diagram illustrating a method of identifying an object in a scene with a camera according to one VIDD arrangement.

FIG. 4 shows a method 400 for identifying an object in a scene with a camera. The goal of method 400 is to determine a sequence 461 of camera settings in order to identify the object of interest 100 with a minimal number of observations. The method 400 will be illustrated by way of example with reference to the PTZ camera 140 capturing the image 120 of a scene containing the candidate object 130, as illustrated in FIG. 1B, in order to determine whether the candidate object is the object of interest 100 illustrated in FIG. 1A. The object of interest is described by a predetermined plurality of attributes, which are determined using methods described below. The method 400 makes no prior assumptions about the candidate object 130 except that it shares the same types of attributes as the object of interest 100. For example, in one VIDD arrangement the candidate object 130 and the object of interest 100 are both pedestrians that have a "hair length" attribute comprising the classes "long hair" or "short hair". In another VIDD arrangement, the candidate object and the object of interest are both vehicles that have a "headlight shape" attribute comprising the classes "round" or "rectangular". The following description is an overview of the entire method 400. Further details, examples and alternative implementations of the steps 410, 420, 425, 430, 440, 450 and 460 are described later.

FIG. 4 is a schematic flow diagram illustrating a method 400 of identifying an object in a scene with a camera according to one VIDD arrangement. The method 400 starts at a Start step 405, performed by the processor 1005 directed by the VIDD software 1033, wherein information from which the attributes of the object of interest 100 can be determined is received as input. In one application of the VIDD arrangement, this information is in the form of one or more images of the object of interest. For example, an object engaging in unusual or suspicious activity is selected and captured as an image that is provided to the step 405 in order to analyse the behaviour of the object of interest 100 in greater detail. In another application of the VIDD arrangement, the information provided to the step 405 is in the form of a semantic description, such as a witness description, of the object of interest. For example, a semantic description of an object such as a missing child is provided to the step 405 in order to locate and recover the object.

Control then passes from the step 405 to a step 410, performed by the processor 1005 directed by the VIDD software 1033, which determines the distinctiveness of each of the plurality of attributes of the object of interest, as described hereinafter in more detail with reference to FIG. 12. The method step 410 can be performed by the processor 1005 as noted, and/or alternately can be implemented as a software, hardware or hybrid hardware/software module for determining distinctiveness of attributes of object of interest. Similar comments apply to the other method steps referred to in the description.

Figure 12:
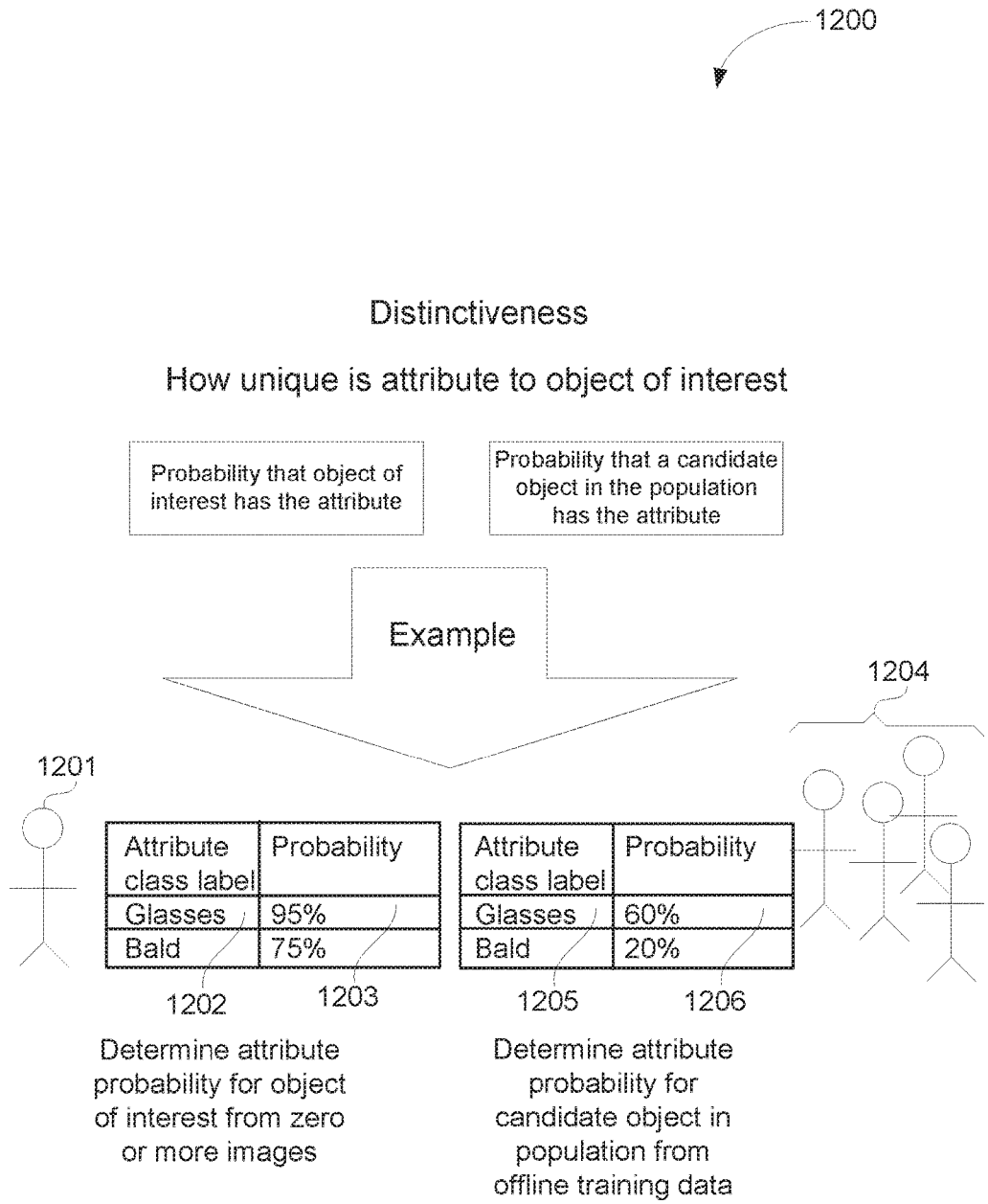
FIG. 12 depicts an example of how distinctiveness is determined, as used in step 440 in FIG. 4.

FIG. 12 depicts an example 1200 showing how in one VIDD arrangement, the distinctiveness of a given attribute label (also referred to as a class label) is represented by a tuple comprising the probability of the attribute label for the object of interest, and the probability of the attribute label for some other object. The distinctiveness of an attribute is thus represented by constructing a tuple comprising the probability of the attribute label for the object of interest, and the frequency of the attribute label in the population. In the example 1200 a person 1201 is the object of interest, and one attribute label for the object of interest is "wears glasses" 1202. A probability 1203 of the attribute label 1202 in the example 1200 is 95%, indicating that there is a 95% probability that the object of interest 1201 is wearing glasses. In the example 1200 a set 1204 of people is a population of candidate objects of interest, and a probability 1206 of the corresponding attribute label 1205 in the example 1200 is 60%, indicating that there is a 60% probability that a candidate object of interest in the population 1204 is wearing glasses. In the example 1200 the tuple indicating the distinctiveness of the given attribute label "wears glasses" is (1203, 1206).

The probabilities 1203, 1206 (see 411 in FIG. 4) correspond to the terms $p(a_i|x=1)$ and $p(a_i|x=0)$ in Equation (1) respectively, these being a measure of the distinctiveness of the attribute $a_i$ for the object of interest, which is independent of the viewpoint of any specific camera.

In one VIDD arrangement, the probability of an attribute label $a_i$ for the object of interest $p(a_i|x=1)$ is determined from a semantic (textual or verbal) description. In one example, an object of interest is specified by three attributes, these being "eyewear", "sleeve length" and "facial hair style", and a witness describes the object of interest as "wearing a t-shirt and glasses". Based on the confidence (or trustworthiness) of the witness, the probability of "short sleeves" for attribute "sleeve length" is assigned as 0.9, and the probability of "wearing spectacles" for attribute "eyewear" is assigned 0.95. Furthermore, since the witness did not mention the presence of a beard, the probability of "clean shaven" for attribute "facial hair style" is assigned as 0.7. This attribute label is assigned a lower confidence than "short sleeves" or "wearing spectacles", since it is also possible that the witness did not register the presence of a beard. In an alternative VIDD arrangement, the probability of an attribute label for the object of interest is determined by manual inspection of one or more images of the object of interest by a security guard or other operator. In yet another VIDD arrangement, the probability of an attribute label for the object of interest is determined by automatic annotation of one or more images of the object of interest. Automatic annotation is implemented by first detecting attributes using an example of the method 430 in FIG. 7A, and then solving the Attribute Inference Constraints in Equation (2) for the probability distribution $p(a_i=l_i|x=1)$ over class labels.

In order to determine the distinctiveness of an attribute label at step 410 of process 400, the probability of the attribute label for some other object $p(a_i|x=0)$ (that is, an object other than the object of interest) must also be determined. In one VIDD arrangement, corresponding to an object selected randomly from the population of all other objects sharing the attribute, the probability of the attribute label is determined from expert knowledge, such as knowledge derived from surveys and market research. In another VIDD arrangement, corresponding to an object selected randomly from the population of objects previously observed by any camera capturing an image 120 of the scene in question, the probability of an attribute label is determined from the frequency of the attribute amongst the previously observed objects. In yet another VIDD arrangement, independent attribute statistics are maintained for different times of the day and different seasons of the year to account for periodic variations in the attributes of objects (for example, pedestrians wear sunglasses more often during the day than at night). The distinctiveness of an attribute label is then determined when the candidate object is detected in step 420 of method 400 by selecting the attribute statistics corresponding to the time at which the image of the candidate object was captured.

Method 400 then proceeds from step 410 to 420, performed by the processor 1005 directed by the VIDD software 1033, wherein one or more frames are captured by the PTZ camera 140 and the candidate object 130 is detected and tracked. As noted above, the step 420 uses distinctiveness of attribute labels which are determined using the attribute statistics corresponding to the time at which the image of the candidate object was captured. In one VIDD arrangement, the candidate object is detected at the step 420 by performing foreground separation using a statistical background pixel modelling method such as Mixture of Gaussian (MoG), wherein the background model is maintained over multiple frames with a fixed camera setting. In another VIDD arrangement, a foreground separation method is performed on Discrete Cosine Transform blocks. In yet another VIDD arrangement, a foreground separation is performed on an unsupervised segmentation of the frame, for example using superpixels. In still yet another VIDD arrangement, the candidate object is detected using a supervised machine learning method such a pedestrian detector. The pedestrian detector classifies a set of regions of interest as containing a pedestrian or not based on a training set of pedestrian exemplars. In one VIDD arrangement, the output of step 420 is the rectangular bounding box 135 (see FIG. 1) indicating a region of interest on the image plane 120 containing the candidate object 130. In another VIDD arrangement, the output of step 420 is a binary image map indicating the region of pixels that belong to the candidate object and the region of pixels that belong to the background.

In some scenes, more than one candidate object is detected at step 420. In one implementation of the step 420, object detection is followed by performing object tracking on the detected candidate objects in order to associate observations of the same candidate object over multiple frames. In one VIDD arrangement, tracking is performed by assuming Brownian motion and associating a candidate object in one frame to the candidate object at the nearest pixel location in a previous frame. In another VIDD arrangement, tracking is performed by estimating the motion of the object using a recursive Bayesian filter such as a Kalman filter or particle filter. In still another VIDD arrangement, tracking is performed using appearance information about the object in addition to positional and velocity information.

The method 400 then proceeds from the step 420 to a step 425, performed by the processor 1005 directed by the VIDD software 1033, described hereinafter in more detail with reference to FIG. 5, which determines a relative orientation of the candidate object 130 with respect to a viewpoint of the camera 140. In one VIDD arrangement, the relative orientation is determined using a machine learning approach to classify the image of the candidate object into a set of discrete orientation classes (e.g. "front view", "profile view" and "rear view"). The classifier is trained on a set of exemplars from each class. In another VIDD arrangement, the relative orientation is determined using model-based pose estimation to fit a model of the candidate object to the image of the candidate object, based on extracted features such as edges. In yet another VIDD arrangement, the relative orientation is determined based on the direction of motion of the candidate object, as represented by the bearing angle $\theta$ in Equation (7). This VIDD arrangement example is described hereinafter in more detail with reference to FIGS. 5, 6A and 6B.

Figure 7B:
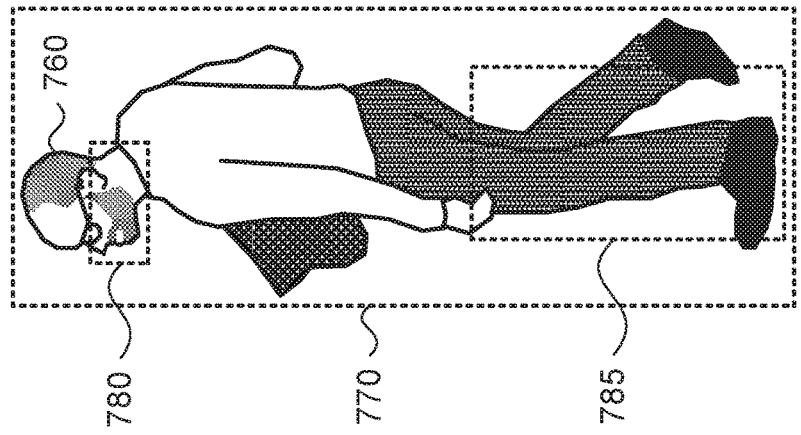
FIG. 7B shows examples of regions of interest for detecting attributes of a candidate object according to one implementation of the method of FIG. 7A.

The method 400 then proceeds from the step 425 to a step 430, performed by the processor 1005 directed by the VIDD software 1033 and described hereinafter in more detail with reference to FIGS. 7A and 7B, which classifies the attributes of the candidate object detected in step 420. In one VIDD arrangement, an attribute is classified by computing a matching score between features of the detected candidate and one or more template images of each attribute class. In another VIDD arrangement, an attribute is classified by applying a predetermined threshold to features extracted from a region of the detected candidate. For example, the attribute "shirt shade" comprising the classes "light" and "dark" is classified by applying a predetermined threshold to the average grey level of pixels in the torso region. In yet another VIDD arrangement, an attribute is classified using supervised learning, wherein a classifier is learned from a set of labelled training images of each class.

The method 400 then proceeds from step 430 to step 440, performed by the processor 1005 directed by the VIDD software 1033 and described hereinafter in more detail with reference to FIG. 8 which determines a confidence (p(x|d,v) from Equation (1)) that the candidate object is the object of interest, based on the attributes of the object of interest determined at the step 410, the attributes of the candidate object determined at the step 430 and the relative orientation of the candidate object determined at the step 425. In one VIDD arrangement, the step 440 computes the posterior probability in Equation (1). Control then proceeds from step the 440 to a decision step 450, performed by the processor 1005 directed by the VIDD software 1033, which determines whether or not the identity of the candidate object can be determined based on the computed posterior probability 441. In one VIDD arrangement, the posterior probability determined at the step 440 is compared to an upper threshold, e.g. 0.95, and a lower threshold, e.g. 0.05. If the posterior probability is above the upper threshold or below the lower threshold, then the confidence in the identity of the candidate object is high, otherwise the confidence in the identity of the candidate object is low. If the confidence in the identity of the candidate object is low, control follows a NO arrow and passes from the step 450 to a step 460, described hereinafter in more detail with reference to FIG. 9. The step 460 is performed by the processor 1005 directed by the VIDD software 1033, and plans a new camera setting. If the confidence in the identity of the candidate object is high, control follows a YES arrow and passes from step 450 to an End step 499.

The step 460 determines a camera setting to improve the confidence in the estimate of the identity of the candidate object by increasing the detectability of the most distinctive observable attributes. In one VIDD arrangement, a fixed set of camera settings are generated based on predetermined rules, and the setting that maximizes the increase in information about the identity of the candidate object is selected. For example, the rules may generate camera settings based on zoomed-in views of specific regions of the candidate object, such as the "head", "torso" and "legs" in the case of a pedestrian. In another VIDD arrangement, a numerical optimization such as an iterative descent search is performed to determine the camera setting that maximizes the increase in information about the identity of the candidate object. After planning a new camera setting at the step 460, control loops back to the step 420, wherein a new image of the candidate object is captured using the new camera settings to update the confidence that the candidate object is the object of interest.

The final identity of the candidate object is determined by the final posterior probability determined using Equation (1) at the End step 499. In one VIDD arrangement, the final posterior probability of the candidate object is compared to a predetermined upper threshold, e.g. 0.95, and lower threshold, e.g. 0.05. If the posterior probability is above the upper threshold, the candidate object is classified as being the object of interest. If the posterior probability is below the lower threshold, the candidate object is classified as not being the object of interest.

FIG. 4 illustrates one example 400 for implementing the VIDD arrangement, in which a sequence of observations is planned in order to determine whether a single candidate object is the object of interest. Variations of this method may equally be practised. In one alternative VIDD variation, a sequence of observations is planned in order to determine the identity of more than one candidate object. In one implementation of this variation, the step 420 detects and tracks multiple candidate objects and the step 425 determines the relative orientation of each candidate object. The step 430 classifies, independently of other candidate objects, the attributes for each candidate object. Similarly, the step 440 determines, independently of other candidate objects, the posterior probability of whether each candidate object is the object of interest. In one VIDD arrangement, a step 450 then decides if at least one candidate object has a high confidence of being the object of interest. If so, control passes to the End step 499 where the object with the highest posterior probability is classified as the object of interest. If not, control passes to the step 460, which plans a new camera setting to maximize the confidence in the identity over all candidate objects.

In another alternative variation of method 400, a user (for example, a security guard) monitors the method 400 and terminates the process when the object of interest has been identified. In one implementation of this variation, the step 440 computes the posterior probability for each candidate object and then ranks all candidate objects as being the object of interest from greatest confidence to least confidence. In one implementation of the decision step 450, the top ranked objects (for example, the three objects with the highest posterior probability) are presented to the user. If the user decides that one of the objects is the object of interest, control passes to the End step 499. If the user decides that none of the objects are the object of interest, control passes to the step 460, which plans a new camera setting as described in the above VIDD arrangements.

Figure 5:
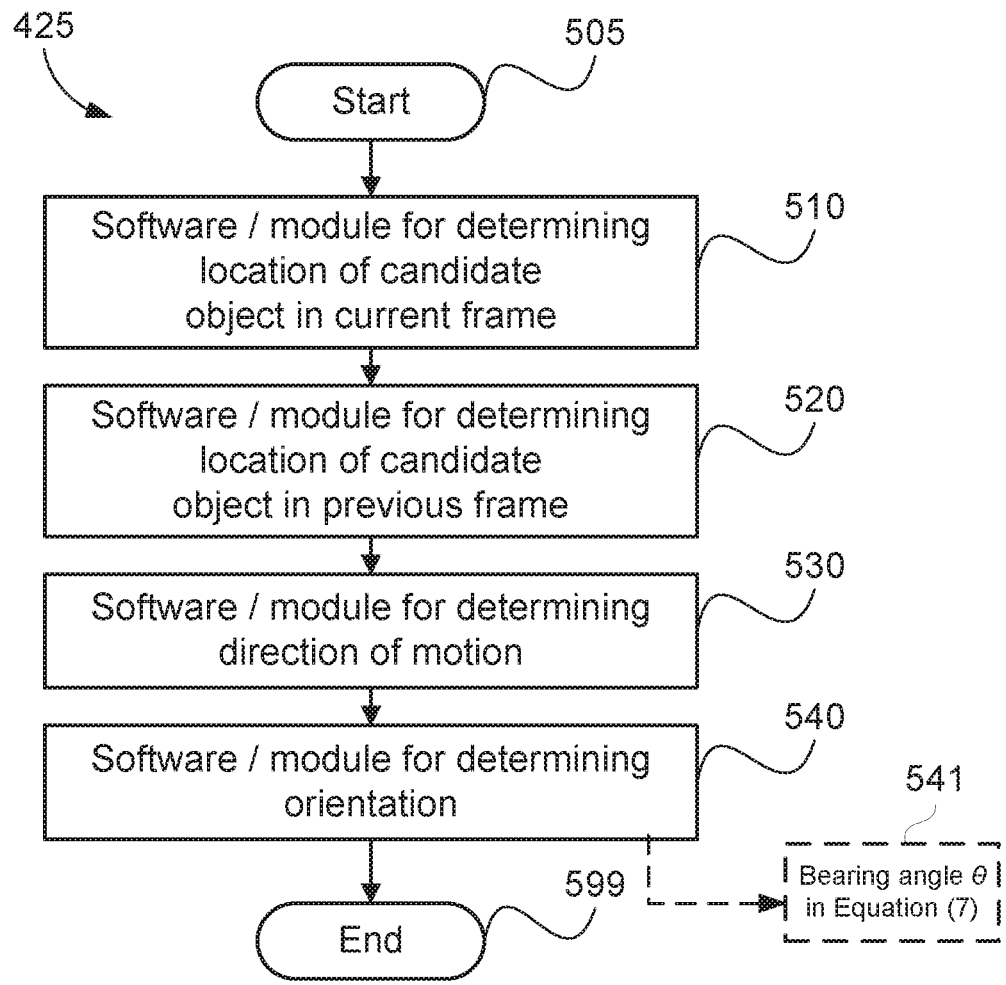
FIGS. 5, 6A and 6B collectively illustrate a method of determining the relative orientation of a candidate object according to one implementation of the method of FIG. 4.
Figure 6A:
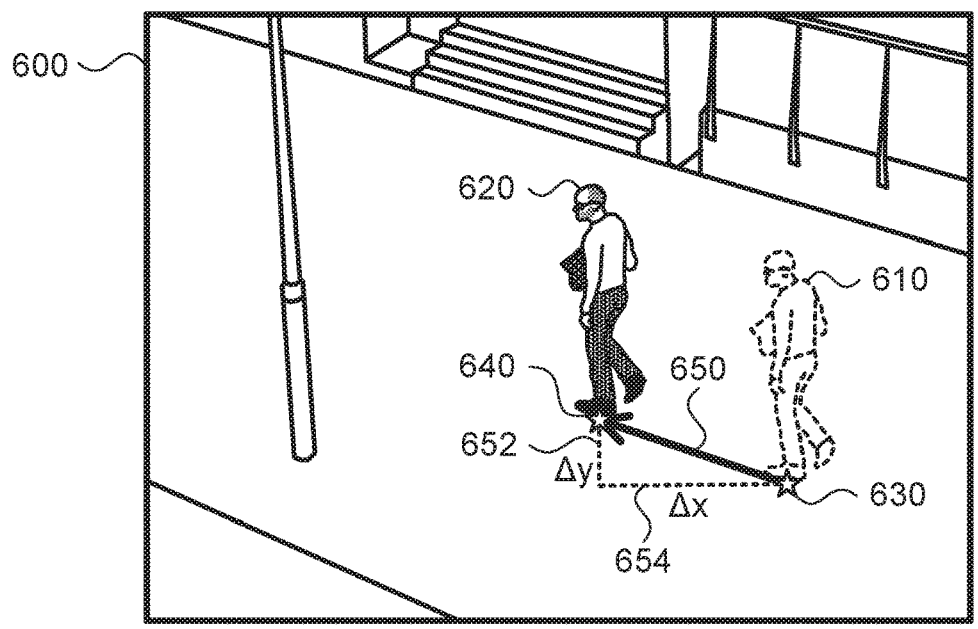
Figure 6B:
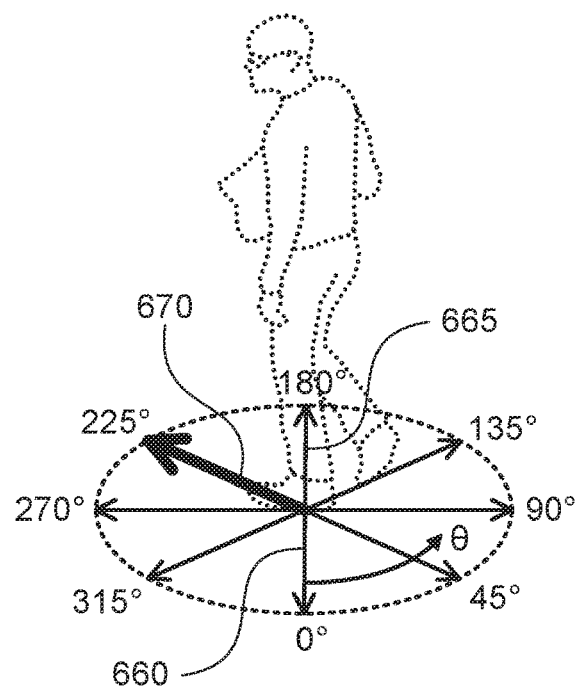

FIG. 5 illustrates an example implementation of the step 425 in the method 400 in FIG. 4 for determining a relative orientation 541 of a candidate object based on the direction of motion. The method 425 will be described by way of example with reference to a candidate object 620 in an image 600 of a scene, as illustrated in FIGS. 6A and 6B. The method 425 determines a direction of motion based on a first order finite difference approximation to the change in location of the candidate object, as observed in a pair of frames captured at two different times. The relative orientation 541 determined by this method is used in a step 820 of the method 440 (see FIG. 8) and in a step 920 of the method 460 (see FIG. 9) in order to determine the detectability of each attribute in a given camera setting.

The method 425 in FIG. 5 starts at a Start step 505 performed by the processor 1005 directed by the VIDD software 1033, wherein a current frame 600 of the scene and a frame captured at a previous time are received as input. Both the current and previous frames contain the candidate object. Control then passes from the step 505 to a step 510 performed by the processor 1005 directed by the VIDD software 1033, which determines a point in the current frame representing the location of the candidate object. This point may be determined relative to a bounding box containing the candidate object, as detected in one implementation of the step 420 of the method 400. For example, in one implementation of the step 510, the centre of the lowest edge of the bounding box (i.e. the "footprint") is taken as the location of the candidate object. In an alternative implementation of the step 510, a centroid of the bounding box is taken as the location of the candidate object, which may be more robust to noise. Other implementations of the step 510 may use the location of particular parts to locate the candidate object. For example, another alternative implementation of the step 510 for pedestrians uses the head location of the candidate object, as detected using an "omega-shape" detector. This location has the advantage of being distinctive and detectable with high precision over different frames. Yet another alternative VIDD arrangement uses the lowest point on the foreground mask of the candidate object (as detected in one implementation of step 420 in the method 400) as the location of the candidate object.

Control then passes from the step 510 to a step 520 performed by the processor 1005 directed by the VIDD software 1033, which determines a point in the previous frame representing the location of the candidate object. Implementations of the step 520 are identical to the alternative implementations for the step 510 as described above (applied to the previous frame), wherein the same implementation is used for both the steps 510 and 520. This ensures that the relative location of the point between the current and previous frames represents the direction of motion, and not a shift in the location of the point relative to the candidate object.

The method 425 then proceeds from the step 520 to a step 530 performed by the processor 1005 directed by the VIDD software 1033, which determines the direction of motion of the candidate object based on the locations determined in the steps 510 and 520. In one VIDD arrangement, the step 530 computes a vector representing the relative change in the location of the candidate object from the previous frame to the current frame.

FIG. 6A illustrates one implementation of the steps 510, 520 and 530 by way of example. First, a lowest point 640 on the candidate object 620 in the current frame is determined at the step 510. Then, a lowest point 630 on the candidate object 610 in the previous frame is determined at the step 520. Finally, a vector 650 from the previous location 630 to the current location 640 is computed as a first order finite difference approximation to the direction of motion. This vector is decomposed into a change in position in the horizontal direction of the image, denoted by 654 in FIG. 6A and represented as $\Delta x$, and a change in position in the vertical direction, denoted by 652 in FIG. 6A and represented as $\Delta y$.

Control then passes from the step 530 to the step 540, performed by the processor 1005 directed by the VIDD software 1033, which determines the orientation of the candidate object based on the direction of motion determined at the step 530. In one implementation of the step 540, as illustrated in FIG. 6B, the relative orientation of the candidate object is represented by a bearing angle $\theta$ on the ground plane in the scene. In this VIDD arrangement, a bearing angle $\theta$ of 0° represents an object facing towards the camera, as indicated by a direction 660 in FIG. 6B, and a bearing angle of 180° represents an object facing away from the camera, as indicated by a direction 665 in FIG. 6B. Let $\varphi$ represent the tilt angle of the camera, where a tilt of 0° corresponds to a horizontal camera and a tilt of 90° corresponds to a downward facing camera. Then, a "Ground Plane Orientation Equation" may be defined in accordance with Equation (7) to approximately compute the bearing angle $\theta$ of the candidate object on the ground plane from the direction of motion represented by $\Delta x$ and $\Delta y$ as follows:

$$\theta = \arctan(\Delta y / (\Delta x \cdot \sin(\varphi))) \quad (7)$$

In one implementation of the step 540, the bearing angle computed using Equation (7) is taken as the relative orientation of the candidate object. In another implementation of the step 540, the bearing angle computed using Equation (7) is further quantized to the nearest angle in a set of discrete angles. This enables the detectability of attributes determined at the step 820 of the process 440 (see FIG. 8) to be characterized by a small number of possible viewing conditions. The quantization is illustrated by way of example with reference to FIG. 6B, which illustrates a quantization into 8 discrete orientations at regular intervals of 45°. In the example of the motion direction 650 shown in FIG. 6A, the quantization results in an object orientation of 225° as indicated by the direction 670 in FIG. 6A. The method 425 then proceeds from the step 540 to an end step 599, which outputs the determined relative orientation 541 of the candidate object.

The method 425 in FIG. 5 illustrates one implementation for the step 425 of the method 400 in FIG. 4, in which the orientation of the candidate object is determined from the direction of motion. Variations of this method may equally be practised. In one alternative VIDD arrangement, the direction of motion is estimated from the current frame and two or more previous frames containing the candidate object, based on a second or higher order finite difference approximation to the change in location of the candidate object. In another alternative VIDD arrangement, the direction of motion is estimated by a recursive Bayesian filter, such as a Kalman filter or particle filter, based on all previous observations of the candidate object. Other implementations for the step 425 of the method 400 that are not based on the direction of motion are also possible. For example, one alternative VIDD arrangement uses a machine learning approach to classify discrete orientation classes and another alternative VIDD arrangement uses model-based pose estimation. Both of these alternative VIDD arrangements have been discussed earlier.

Figure 7A:
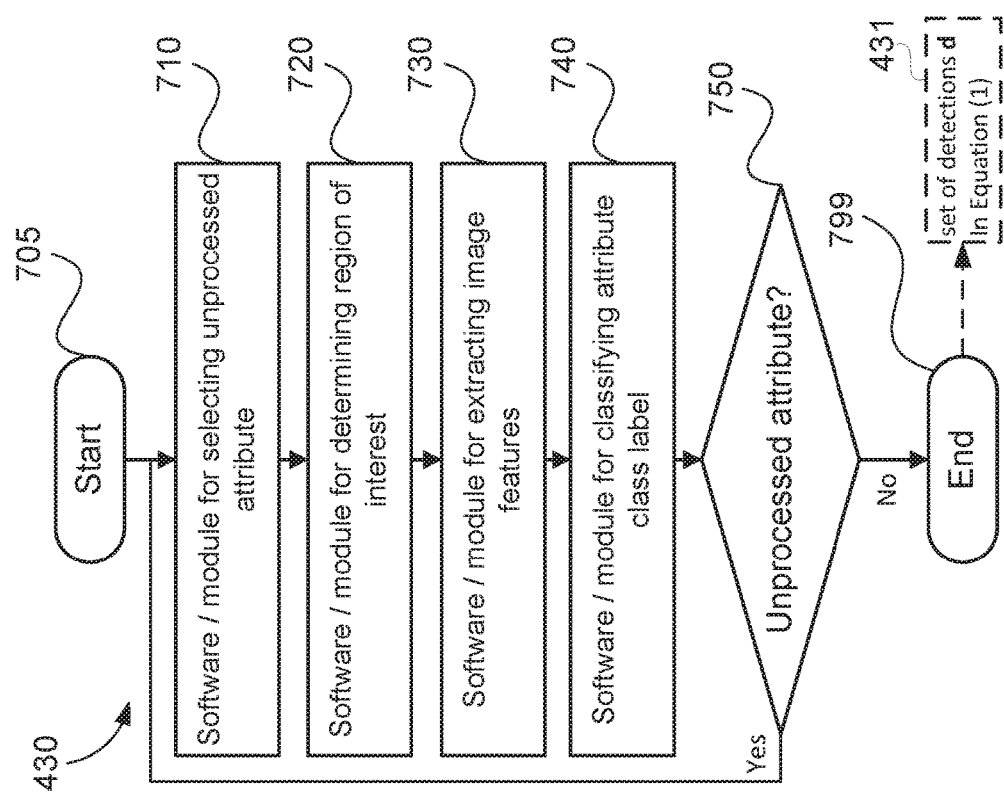
FIG. 7A is a schematic flow diagram illustrating a method of detecting the attributes of a candidate object as used in the method of FIG. 4.

FIG. 7A illustrates an example of the method 430 (see FIG. 4) for detecting noisy observations of attributes of a candidate object. The noisy observations detected at this step are used to determine a confidence that the candidate object is the object of interest at the step 440 of method 400. In the Bayesian model illustrated by example in FIG. 3, the noisy observations detected at this step correspond to variables $d_1$ and $d_2$ at nodes 365 and 375 respectively. These detections are noisy observations of the attributes $a_1$ and $a_2$ at nodes 360 and 370. The example of the method 430 will be described with reference to the candidate object 760 in FIG. 7B. The method 430 starts at a start step 705, performed by the processor 1005 directed by the VIDD software 1033, wherein an image of a candidate object detected in the step 420 of the method 400 is received as input. The method 430 then proceeds from the start step 705 to a step 710, performed by the processor 1005 directed by the VIDD software 1033, which selects an unprocessed attribute from the set of all attributes.

Control then passes from the step 710 to a step 720, performed by the processor 1005 directed by the VIDD software 1033, which determines a region of interest to be processed in order to classify the selected attribute. For example, in one VIDD arrangement the regions of interest 780 and 785 in FIG. 7B are used to classify the attributes "facial hair style" and "pants length" respectively. Determining the region of interest aligns the input data, which is an important step to improve the accuracy of the attribute classifier. In one VIDD arrangement, the region of interest is determined by a fixed relationship with the bounding box 770 of the candidate object determined at the detection step 420 of method 400. In another VIDD arrangement, the region of interest for an attribute is determined by detecting specific parts of the candidate object. In one example, an "omega-shape" head detector is used to determine the region of interest on a pedestrian.

The method 430 then proceeds from the step 720 to a step 730, performed by the processor 1005 directed by the VIDD software 1033, which constructs a feature vector from pixel values in the region of interest for the selected attribute. This step reduces the high dimensional image data to a low dimensional feature vector that can be more efficiently classified, and improves the robustness of the classifier to variations in lighting, viewpoint and other sources of noise. For example, 1200 colour values in a 20×20 pixel region from an RGB image can be reduced in dimensionality to a 3×3×3 RGB histogram with only 27 values. The RGB histogram discards the spatial layout of the pixels, which provides greater invariance to viewpoint than the original pixel region. In one VIDD arrangement, the features are low-level image descriptors for the colour, shape and texture of the image content. Examples of low-level colour-based descriptors are greyscale colour histograms, RGB colour histograms, HSV colour histograms and colour correlograms computed on the region of interest. Examples of low-level shape-based descriptors are histograms of oriented gradients (HOG), scale-invariant feature transform (SIFT) and shapelets. Examples of low-level texture-based descriptors are local binary patterns (LBP) and Gabor filter histograms. In another VIDD arrangement, features are learned from a set of labelled training images of the attribute classes. In one example, Fisher discriminant analysis is applied to learn a subspace projection that maximizes the separation between attribute classes.

Control then passes from the step 730 to a step 740, performed by the processor 1005 directed by the VIDD software 1033, which uses the features extracted at the step 730 to assign a class label to the selected attribute of the candidate object. In one example, for the case of the attribute "pants length", the step 740 decides whether the candidate object should be classified as having "long pants" or "short pants" based on the features extracted in the region 785. The attribute classifier is trained using a supervised machine learning method, based on a set of example images for each class label. In one VIDD arrangement, the attribute classifier is trained during an offline training phase, prior to executing the method 400. In an alternative VIDD arrangement, the attribute classifier is updated online while executing the method 400, for example based on feedback from a user about whether the object of interest has been correctly identified. One of many classification techniques may be used to detect attributes. In one VIDD arrangement, the attribute classifier uses a support vector machine (SVM) to discriminate between different attribute class labels. In another VIDD arrangement, the attribute classifier uses a decision tree to discriminate between attribute class labels. In yet another VIDD arrangement, the attribute classifier uses an artificial neural network (ANN) to discriminate between attribute class labels. In still yet another VIDD arrangement, the attribute classifier is implemented using k-nearest neighbour (k-NN) matching.

After assigning a class label to the selected attribute of the candidate object, the method 430 then proceeds from the step 740 to a decision step 750, performed by the processor 1005 directed by the VIDD software 1033, which determines whether any attributes remain unprocessed. If unprocessed attributes remain, control follows a YES arrow and proceeds from the decision step 750 back to the attribute selection step 710. If all attributes have been processed, control follows a NO arrow and passes from the decision step 750 to an End step 799. When the example of the method 430 reaches the End step 799, every attribute from the set of all attributes will have been assigned a class label based on the image of the candidate object received at the Start step 705. These are represented by the noisy observations $d_i$ 431 on the right side of the Posterior Probability Equation given by Equation (1), and are equivalently represented collectively by the set of detections d (where d={$d_i$}) on the left side of Equation (1).

Figure 8:
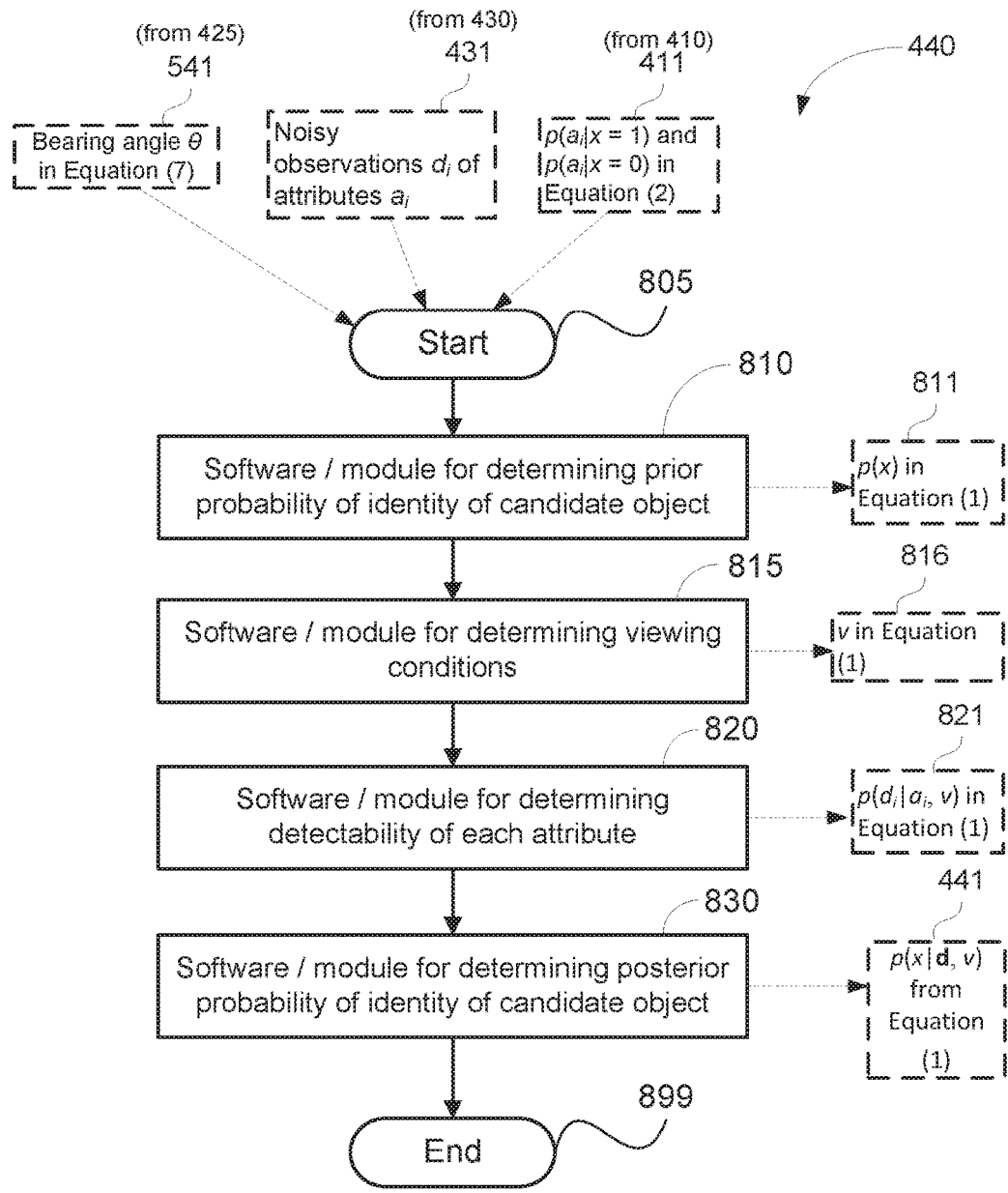
FIG. 8 is a schematic flow diagram illustrating a method of determining the probability that a candidate object is the object of interest as used in the method of FIG. 4.

FIG. 8 illustrates an example of the method 440 (see FIG. 4) for determining a confidence that the candidate object is the object of interest, as used in one implementation of the method 400. The method 440 starts at a Start step 805, wherein the relative orientation 541 of the candidate object as determined at the step 425 of method 400, the set 431 of attribute class labels detected at the step 430 of method 400, and the distinctiveness 411 of each attribute of the object of interest as determined at the step 410 of the method 400 are received as input.

Control then passes from the step 805 to a step 810, performed by the processor 1005 directed by the VIDD software 1033, which determines the prior probability 811 that the candidate object is the object of interest. The prior probability determined at this step serves as the term p(x) in computing the posterior probability using Equation (1). In one VIDD arrangement, if the candidate object has been observed in previous frames, the prior probability takes the value of the posterior probability determined at the step 440 of method 400 based on the said previous frames. If the candidate object has not been previously observed, the prior probability is set to a pre-determined value. In one VIDD arrangement, a pre-determined value of 0.5 is used to indicate maximum uncertainty in the identity of the candidate object. In another VIDD arrangement, the pre-determined value is set by an operator based on manual inspection of the candidate object. In yet another VIDD arrangement, the pre-determined value is based on the likelihood that the object of interest will be observed in the image, given a previously known location of the object of interest.

The method 440 then proceeds from the step 810 to a step 815, performed by the processor 1005 directed by the VIDD software 1033, which determines viewing conditions 816 under which the image of the candidate object was captured. The viewing conditions are represented by v in the expression for the posterior probability given by Equation (1). The viewing conditions include the relative orientation of the candidate object as determined at the step 425 of the method 400 in FIG. 4. In one VIDD arrangement, the viewing conditions also include the lighting conditions (for example, indoors or outdoor lighting). In another VIDD arrangement, the viewing conditions also include information about the spatial resolution of the image of the candidate object, as determined by the size of the candidate object detected in the step 420 of the method 400. In yet another VIDD arrangement, the viewing conditions also include information about the internal parameters of the camera, such as the focal length.

The method 440 then proceeds from the step 815 to a step 820, performed by the processor 1005 directed by the VIDD software 1033, which determines detectability 821 of each attribute in the image 120 of the candidate object, based on the viewing conditions including the relative orientation of the candidate object (e.g. bearing angle θ 541 in Equation (7)) determined at step 425 of method 400. The detectability 821 determined at this step serves as the term $p(d_i|a_i, v)$ in computing the posterior probability using Equation (1). In one VIDD arrangement, the detectability is based on the performance of the classifiers used at the step 740 of the example of the method 430 for detecting attributes of the candidate object. The performance of an attribute classifier is determined by testing the classifier on a set of labelled test images of different objects with the said attribute, captured under a particular viewing condition v. Accordingly, the detectability of an attribute in a particular viewing condition can be determined based on the performance of an attribute classifier for the attribute, on a test set captured under said viewing condition. The detectability is then determined from the test results as follows: $p(d=1|a=1, v)$ takes the value of the true positive rate of the attribute detector, $p(d=0|a=1, v)$ takes the value of the false negative rate of the attribute detector, $p(d=1|a=0, v)$ takes the value of the false positive rate of the attribute detector and finally $p(d=0|a=0, v)$ takes the value of the true negative rate of the attribute detector. The above described test is repeated using sets of test images captured under all viewing conditions v of interest in order to fully characterize the detectability of each attribute. In one VIDD arrangement, the detectability of each attribute is pre-calculated during an offline training phase prior to executing method 400. In another VIDD arrangement, the detectability of each attribute is updated online during execution of method 400. In one example, the detectability is updated online based on feedback from a user about whether the object of interest has been correctly identified.

The method 440 then proceeds from the step 820 to a step 830, performed by the processor 1005 directed by the VIDD software 1033, which computes the posterior probability 441 that the candidate object is the object of interest. In one VIDD arrangement, the posterior probability 441 (i.e. $p(x|d, v)$) is computed using Equation (1) based the prior probability p(x) (i.e. 811) determined at the step 810 of the method 440, the distinctiveness 411 of each attribute $p(a_i|x)$ determined at the step 410 of the method 400, the attribute labels d (i.e. 431) detected at the step 430 of the method 400, and the detectability 821 of each attribute $p(d_i|a_i, v)$ determined at the step 820 of the method 440.

In some cases, the PTZ camera zooms-in on a small region on the candidate object, in which case not all attributes of the object can be observed. For example, the pants length is not observable if the PTZ zooms-in on the head. One implementation of the step 830 determines which attributes are unobserved based on the camera settings and relative orientation of the object, and determines the posterior probability by computing the product terms in the numerator and denominator of Equation (1) only over the observed attributes. However, this may lead to an optimistic estimate of the posterior probability, since attributes may be less discriminative when fewer attributes are used. Following the previous example, consider a candidate with the same hair colour (the observed attribute) as the object of interest, but a different pants length (the unobserved attribute). Then, a posterior probability computed using only the hair colour would be optimistically high. To overcome this problem, an alternative implementation of step 830 computes the posterior probability in Equation (1) by computing the product terms in the numerator and denominator over detections in the current frame for attributes that are visible in the current frame, and substituting the most recent detections from previous frames for attributes that are unobservable in the current frame.

After computing the posterior probability, the method 440 then proceeds from the step 830 to an End step 899, performed by the processor 1005 directed by the VIDD software 1033, which outputs the computed posterior probability 441 representing the current knowledge of whether the candidate object is the object of interest.

The method 440 in FIG. 8 illustrates one implementation for the step 440 of method 400 in FIG. 4. Variations of this method may equally be practised. An assumption of the VIDD arrangement described above is that each candidate object can be re-identified independently. In practice, multiple candidate objects appearing within the same view may not be independent, since at most only one candidate object can be the tagged target (i.e. the object of interest). In alternative implementation of the method 440, this limitation is addressed by replacing the binary identity variable $x \in \{0, 1\}$ with a multi-class variable $y \in \{0, 1, 2, \ldots\}$, where y=0 indicates that none of the candidate objects are the object of interest, and y=j indicates that candidate j is the object of interest. The steps 810, 815 and 820 of the method 440 determine the prior probability, viewing conditions and attribute detectability simultaneously for all candidate objects in the current image. Then, the step 830 computes the posterior probability $p(y|d_1, v_1, d_2, v_2, \ldots)$, where $d_j$ and $v_j$ are respectively the detected attributes and viewing conditions for candidate j.

Figure 9:
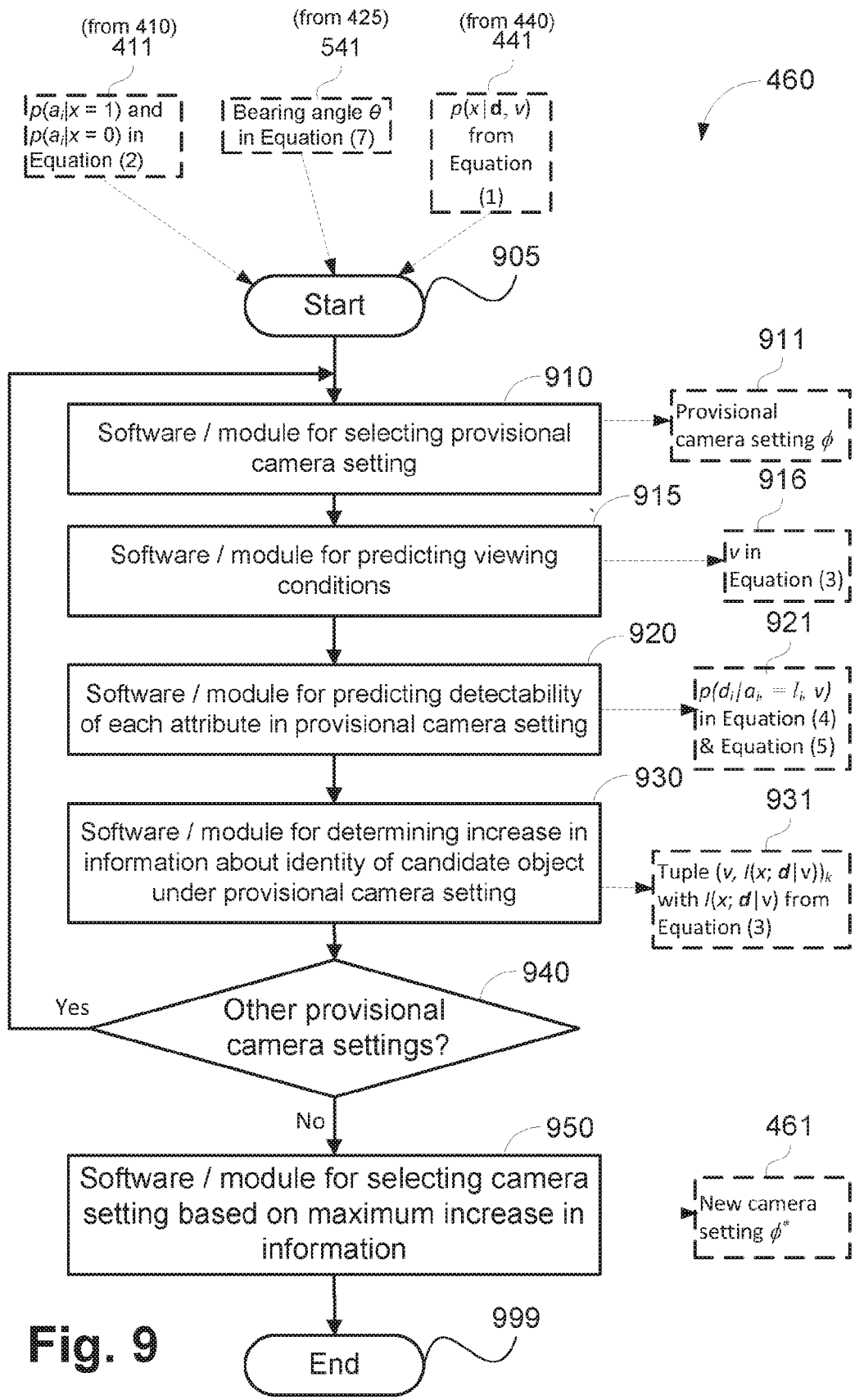
FIG. 9 is a schematic flow diagram illustrating a method of selecting a new camera setting according to one implementation of the method of FIG. 4.

FIG. 9 illustrates an example of the method 460 for determining a new camera setting, as used in the method 400 in FIG. 4. The purpose of the method 460 (see FIG. 9) is to determine an optimal camera setting for viewing the candidate object, based in part on the distinctiveness of at least one attribute of the object of interest, to improve the confidence in the identity of the candidate object by increasing the detectability of at least one attribute. Accordingly, determining a camera setting for viewing the candidate object can be based on the determined distinctiveness of at least one attribute, so as to increase the detectability of the at least one attribute. In the exemplary VIDD arrangement illustrated in FIG. 1B, the camera setting corresponds to the pan, tilt and zoom settings of the PTZ camera 140. In another VIDD arrangement, the camera setting corresponds to a region of interest within a high-resolution video stream. The implementation of the method 460 illustrated in FIG. 9 is a numerical search over the space of camera settings, in which provisional camera settings are repeatedly selected and tested until the optimal camera setting is identified.

The method 460 (see FIG. 9) starts at a Start step 905, performed by the processor 1005 directed by the VIDD software 1033, wherein the distinctiveness 411 of the attributes of the object of interest $p(a_i|x)$ as determined at step 410 of method 400, the relative orientation 541 (i.e. the bearing angle θ) of the candidate object as determined at the step 425 of method 400, and the posterior probability 441 of the identity of the candidate object $p(x|d, v)$ as determined at step 440 of method 400 are received as input.

Control then passes from the Start step 905 to a step 910, performed by the processor 1005 directed by the VIDD software 1033, wherein a provisional camera setting is selected. Let 0911 represent the provisional camera setting. In one implementation of the step 910, the provisional camera setting is selected based on a set of pre-defined rules. In one variation of this VIDD arrangement, the rules define a set of regions of interest on the candidate object, such as the head, upper body and legs. A provisional camera setting is selected to view one of the regions of interest in high resolution. In at least one implementation of the step 910, selected provisional camera settings are validated to ensure that at least one attribute of the candidate object can be observed, otherwise the provisional camera setting is discarded and a different setting is selected.

The method 460 (see FIG. 9) then proceeds from the step 910 to a step 915, performed by the processor 1005 directed by the VIDD software 1033, which predicts viewing conditions 916 under which the candidate object would be observed if captured using the provisional camera settings. The viewing conditions 916 are represented by v in the Mutual Information Objective Function in Equation (3), and include the predicted relative orientation of the candidate object. In one implementation of the step 915, the current relative orientation 541 of the candidate object (as determined at step 425 of method 400, i.e. the step 540 in FIG. 5) is used as the predicted relative orientation. However, many practical cameras require a short time (the "actuation time") to apply new camera settings and acquire a new frame of the candidate object. For example, a PTZ camera may require a few seconds to change direction and capture a new frame. During this period, the candidate object may also change its relative orientation. To account for these changes, one implementation of the step 915 predicts the future orientation of the candidate object at the time of capturing the next frame based on object tracking and an estimated actuation time. The predicted relative orientation is used in place of the current orientation in the predicted viewing conditions. Other implementations of step 915 are shared with implementations of the step 815 in the method 440, except using viewing conditions based on the provisional camera setting rather than the current camera setting.

Control then passes from the step 915 to a step 920, performed by the processor 1005 directed by the VIDD software 1033, which predicts the detectability of each attribute of the candidate object in the provisional camera setting, based on the predicted viewing conditions determined at step 915. Accordingly, determining a detectability of each of a plurality of attributes can be based on the orientation of a candidate object in the scene. Implementations of the step 920 are shared with implementations of the step 820 in the method 440, wherein the viewing conditions in the current image are replaced with the predicted viewing conditions 921 in the provisional camera setting. In at least one implementation of the step 920, the output 921 is a set of probabilities specifying the true positive rate $p(d_i=1|a_i=1, v)$, false positive rate $p(d_i=1|a_i=0, v)$, true negative rate $p(d_i=0|a_i=0, v)$ and false negative rate $p(d_i=0|a_i=1, v)$ of each attribute detector under the predicted viewing conditions v.

The method 460 (see FIG. 9) then proceeds from the step 920 to a step 930, performed by the processor 1005 directed by the VIDD software 1033, which determines the increase in information about the identity of the candidate object if the candidate object were to be observed using the provisional camera setting. In one VIDD arrangement, the increase in information is measured according to the Mutual Information Objective Function in Equation (3). Accordingly, a camera setting for viewing the candidate object can be determined by maximizing the mutual information between the observed attributes in the said camera setting, and the identity of the candidate object. The terms in this equation (see also Equations (4) and (5)) are the detectability of each attribute $p(d_i|a_i, v)$ as determined at step 920, the distinctiveness of attributes of the object of interest $p(a_i|x)$ as determined at step 410 of method 400, and the confidence that the candidate object is the object of interest, represented by the prior probability term $p(x)$. The prior probability term takes the value of the posterior probability of the identity of the candidate object $p(x|d, v)$ determined at step 440 of method 400. Accordingly, the camera setting for viewing the candidate object can also be determined based on a confidence that the candidate object is the object of interest. The provisional camera setting selected at step 910 and the corresponding increase in information determined at step 930 for the k-th provisional camera setting comprise a tuple $(\phi, I(x; d|v))_k$ that is stored in computer memory.

The method 460 (see FIG. 9) then proceeds from the step 930 to a decision step 940, performed by the processor 1005 directed by the VIDD software 1033, which determines whether additional provisional camera settings should be processed. In one VIDD arrangement, wherein provisional camera settings are generated based on regions of interest on the candidate object, additional provisional camera settings are processed by the step 940 in sequence until the increase in information has been determined for all said regions of interest. If additional provisional camera settings should be processed, control follows a YES arrow and loops from the step 940 back to the step 910. If no additional provisional camera settings remain, control follows a NO arrow and passes from the step 940 to a step 950, performed by the processor 1005 directed by the VIDD software 1033, which selects a new camera setting. In one implementation of the step 950, stored tuples $(\phi, I(x; d|v))_k$ 931 (for k=1 . . . K, where K is the number of provisional camera settings) recording the provisional camera setting selected at the step 910 and the corresponding mutual information determined at the step 930 in each iteration of the method 460 (see FIG. 9) are compared. The tuple $(\phi^*, I^*(x; d|v))$ corresponding to the tuple with the maximum mutual information from amongst the stored tuples $(\phi, I(x; d|v))_k$ is selected, and the camera setting $\phi^*$ from the selected tuple is output as the new camera setting 461 at step 450 in FIG. 9.

The method 460 in FIG. 9 illustrates one implementation for the step 460 of the method 400 depicted in FIG. 4. Variations of this method may equally be practised. The VIDD arrangements described above correspond to rule-based generation of provisional camera settings based on regions of interest on the candidate object. In an alternative VIDD arrangement, corresponding to an iterative descent search over the space of camera settings, a new provisional camera setting is determined at the step 910 based on the provisional camera setting in the previous iteration (or the current camera setting for the first iteration). The step 940 then tests whether the iterative descent has converged, and the step 950 outputs the final camera setting at convergence. In one example of this VIDD arrangement, the step 910 computes an incremental change in the camera setting based on the gradient of the Mutual Information Objective Function in Equation (3), and the step 940 tests whether the change in mutual information is below a threshold between successive iterations.

Other variations of the method 460 (see FIG. 9) aim to further reduce the number of observations required to determine whether the candidate object is the object of interest. One assumption implicit in the Mutual Information Objective Function in Equation (3) is that observations of the same attribute at different times are independent. However, real attribute detectors are likely to produce correlated detections on nearby frames, i.e. repeated observations of the same attribute over a short time generate little new information about the identity of the object. To avoid repeated observations of the same attribute, one implementation of the method 460 (see FIG. 9) imposes a filter at the selection step 910 to discard camera settings that lead to re-observing an attribute within a threshold period of time, for example 5 seconds. Accordingly, determining a camera setting for viewing the candidate object can exclude any camera setting that leads to observing a previously observed attribute within a threshold period of time.

Another assumption implicit in Equation (3) is that information confirming that a candidate object is the object of interest is equally important as information confirming that a candidate object is not the object of interest. However, a practical system may operate more efficiently by preferentially seeking information that confirms that a candidate object is the object of interest, in particular for scenes containing many candidate objects. For example, consider a person of interest with short pants and glasses, and a scene with two candidate people. The first person is observed to wear long pants and the second person is observed to wear short pants in an initial image of the scene. The system should preferentially zoom in to observe the glasses on the second person, even though the information gain may be similar for observing the glasses on the first person, since this may to lead directly to finding the person of interest. In one alternative implementation of the step 930, the Mutual Information Objective Function in Equation (3) is replaced with a "Weighted Mutual Information Objective Function" defined in accordance with Equation (8) as follows:

$$I_w(x; d | v) = \begin{cases} w_h I(x; d | v), & p(x = 1) \geq P_h \\ I(x; d | v), & P_l \leq p(x = 1) \leq P_h \\ w_l I(x; d | v), & p(x = 1) \leq P_l \end{cases} \quad (8)$$

Equation (3) determines a weighted reduction in uncertainty, where candidate objects that are more likely to be the object of interest are preferentially assigned a higher value than objects that are less likely to be the object of interest. Accordingly, the mutual information can be weighted based on a confidence that the candidate object is the object of interest. The term $I(x; d|v)$ in Equation (8) is the mutual information computed using Equation (3), and $I_w(x; d|v)$ is the weighted mutual information. The term $p(x=1)$ is the probability that the candidate is the object of interest, which is assigned the value of the posterior probability $p(x|d, v)$ 441 determined at step 440 of method 400. Terms $P_h$ and $P_l$ are manually pre-defined probability thresholds (e.g. 0.8 and 0.1 respectively) for testing that the identity of the candidate has low uncertainty. Finally, $w_h$ and $w_l$ are manually pre-defined weighting factors (e.g. 2.0 and 0.0 respectively) for candidates that are respectively likely or unlikely to be the object of interest. The weighted mutual information computed using Equation (8) and the camera setting for the k-th provisional camera setting comprise a tuple $(\phi, I_W(x; d|v))_k$ that is stored in computer memory. In one alternative implementation of the step 950, the tuple $(\phi^*, I_W^*(x; d|v))$ corresponding to the tuple with the maximum weighted mutual information from amongst the stored tuples $(\phi, I_W(x; d|v))_k$ is selected, and the camera setting $\phi^*$ from the selected tuple is output as the new camera setting 461 at step 450 in FIG. 9. Using the weighted mutual information defined in Equation (8) instead of the mutual information in Equation (3) leads to more observations of promising candidates. This improves the discrimination between similar candidate objects by allocating more observations to these objects in preference to others.

INDUSTRIAL APPLICABILITY

The arrangements described are applicable to the computer and data processing industries and particularly for applications in the fields of surveillance and security.

The foregoing describes only some embodiments of the present invention, and modifications and/or changes can be made thereto without departing from the scope and spirit of the invention, the embodiments being illustrative and not restrictive.

The invention claimed is:

1. A method of identifying, with a camera, an object in an image of a scene, the method comprising the steps of:
   obtaining relative orientation of a candidate object to the camera;
   selecting at least one of a plurality of attributes of the candidate object in accordance with the obtained relative orientation of the candidate object;
   determining one of a head, an upper body, legs, and a whole body as a region of interest, the determined region of interest including the selected attribute;
   operating a set of at least one of pan, tilt, and zoom corresponding to the determined region of interest so as to observe the selected attribute, and
   identifying an object based on the result of the observation of the selected attribute.

2. The method according to claim 1, wherein the plurality of attributes includes hair length, facial hair style, wearing beard, pants length, and wearing glasses.

3. The method according to claim 1, wherein the obtained relative orientation is a predicted relative orientation based on an actuation time.

4. A tangible non-transitory computer readable storage medium, storing a computer executable software program for directing a processor to perform a method for identifying, with a camera, an object in an image of a scene, the method comprising the steps of:
- obtaining relative orientation of a candidate object to the camera;
- selecting at least one of a plurality of attributes of the candidate object in accordance with the obtained relative orientation of the candidate object;
- determining one of a head, an upper body, legs, and a whole body as a region of interest, the determined region of interest including the selected attribute;
- operating a set of at least one of pan, tilt, and zoom corresponding to the determined region of interest so as to observe the selected attribute, and identifying an object based on the result of the observation of the selected attribute.

5. The tangible non-transitory computer readable storage medium according to claim 4, wherein the plurality of attributes includes hair length, facial hair style, wearing beard, pants length, and wearing glasses.

6. The tangible non-transitory computer readable storage medium according to claim 4, wherein the obtained relative orientation is a predicted relative orientation based on an actuation time.

7. An apparatus for identifying, with a camera, an object in an image of a scene, the apparatus comprising:
- the camera;
- a processor; and
- a computer readable storage device storing a computer executable software program for directing the processor to perform a method comprising the steps of:
  - obtaining relative orientation of a candidate object to the camera;
  - selecting at least one of a plurality of attributes of the candidate object in accordance with the obtained relative orientation of the candidate object;
  - determining one of a head, an upper body, legs, and a whole body as a region of interest, the determined region of interest including the selected attribute;
  - operating a set of at least one of pan, tilt, and zoom corresponding to the determined region of interest so as to observe the selected attribute, and
  - identifying an object based on the result of the observation of the selected attribute.

8. The apparatus according to claim 7, wherein the plurality of attributes includes hair length, facial hair style, wearing beard, pants length, and wearing glasses.

9. The apparatus according to claim 7, wherein the obtained relative orientation is a predicted relative orientation based on an actuation time.

10. The method according to claim 1, wherein the obtained relative orientation is one of front view, profile view, and rear view.

11. The tangible non-transitory computer readable medium according to claim 4, wherein the obtained relative orientation is one of front view, profile view, and rear view.

12. The apparatus according to claim 7, wherein the obtained relative orientation is one of front view, profile view, and rear view.

* * * * *